Aug. 14, 1956 G. T. RANDOL 2,758,683
AUTOMOTIVE TRANSMISSION CONTROL SYSTEM AND MECHANISM
Original Filed Aug. 3, 1948 17 Sheets-Sheet 2
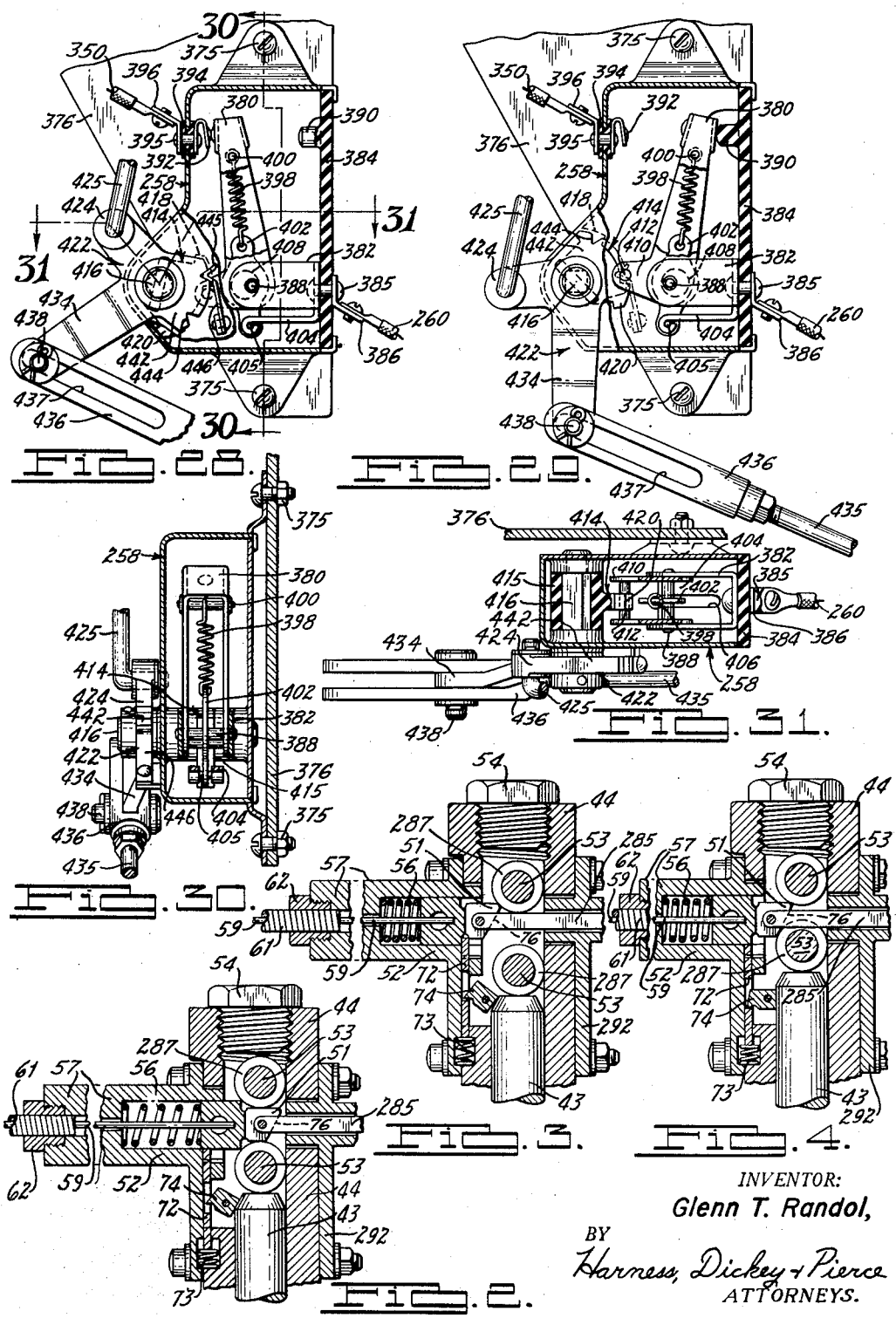
INVENTOR:
Glenn T. Randol,
BY
Harness, Dickey & Pierce
ATTORNEYS.

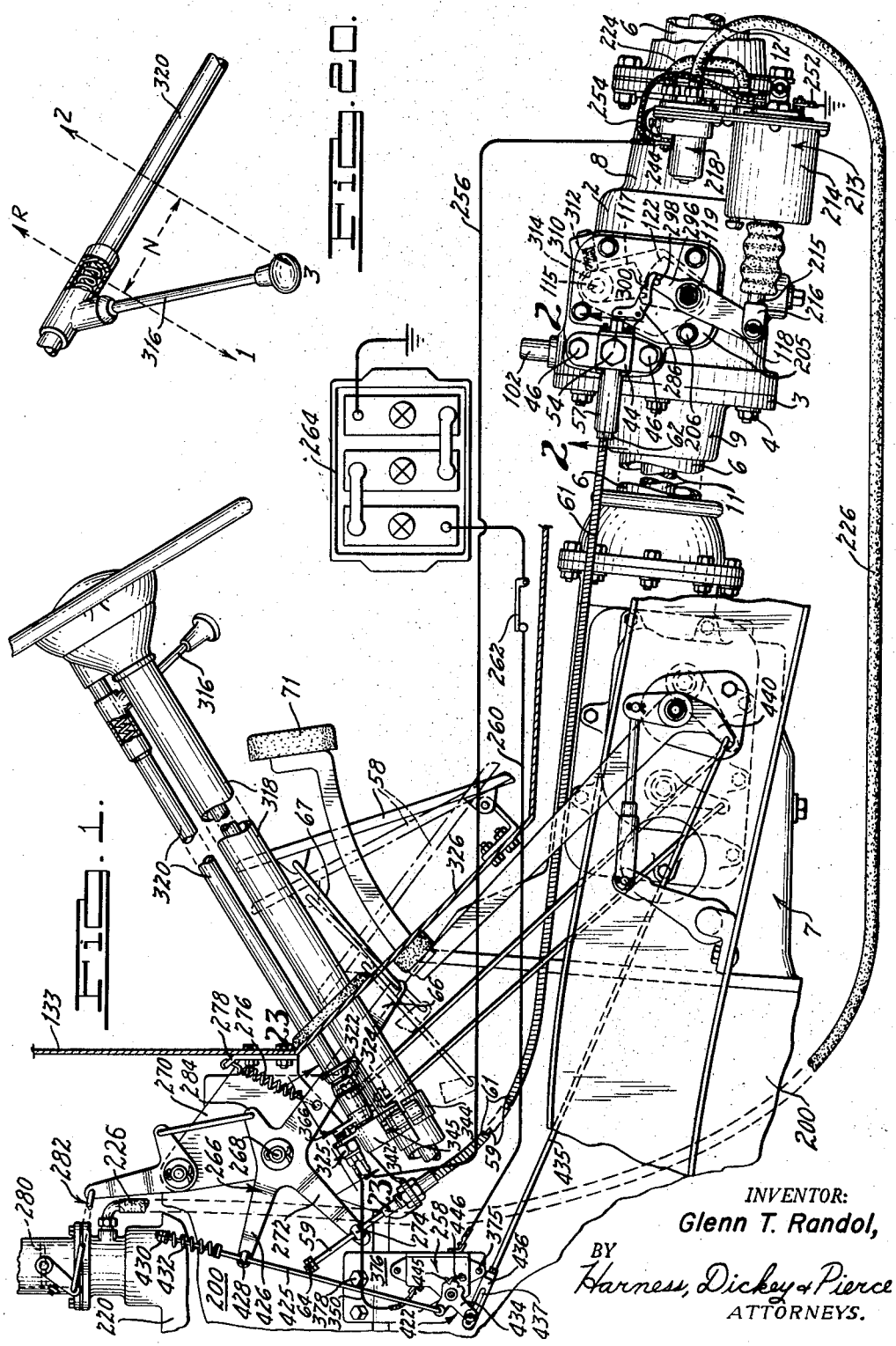

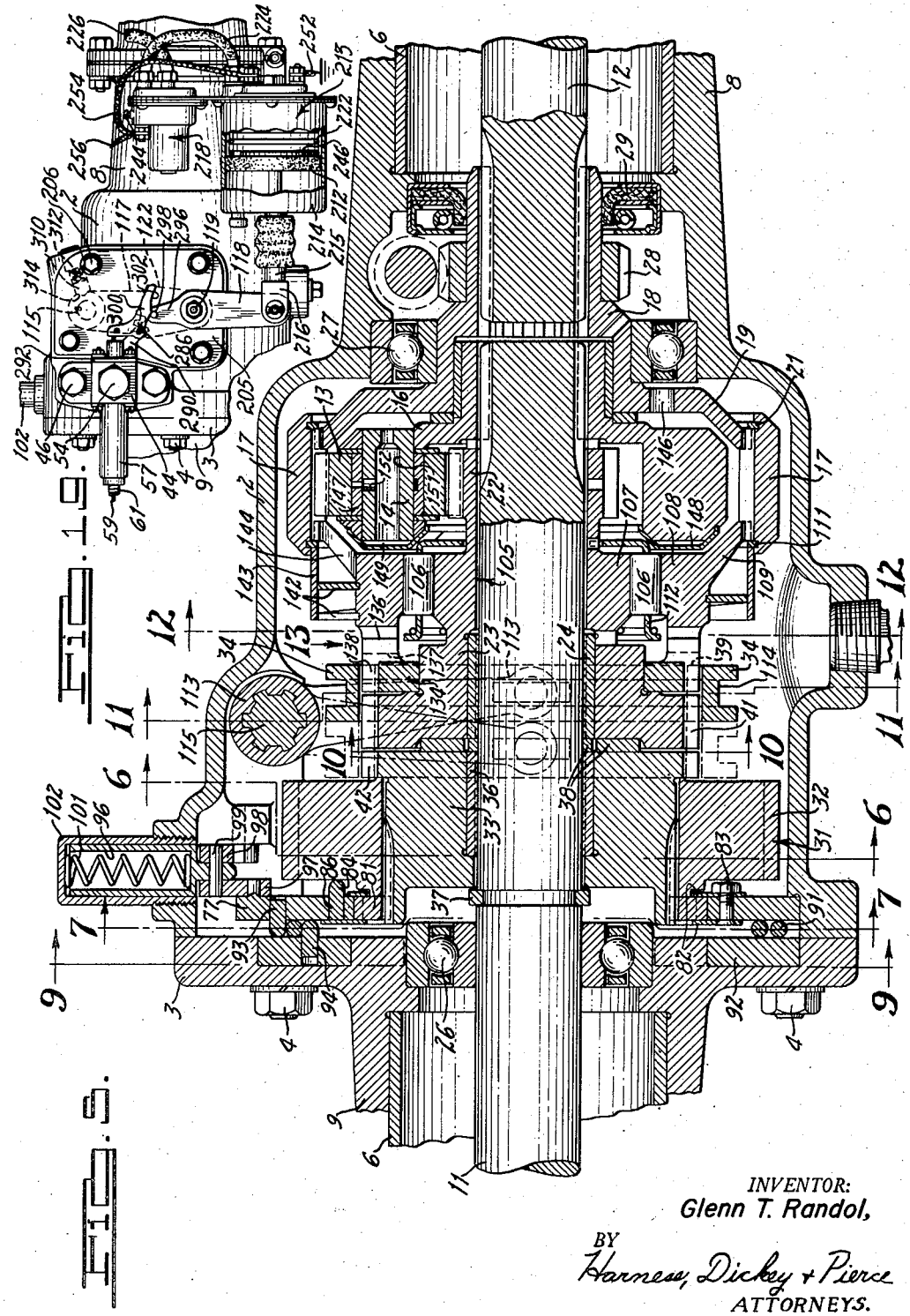

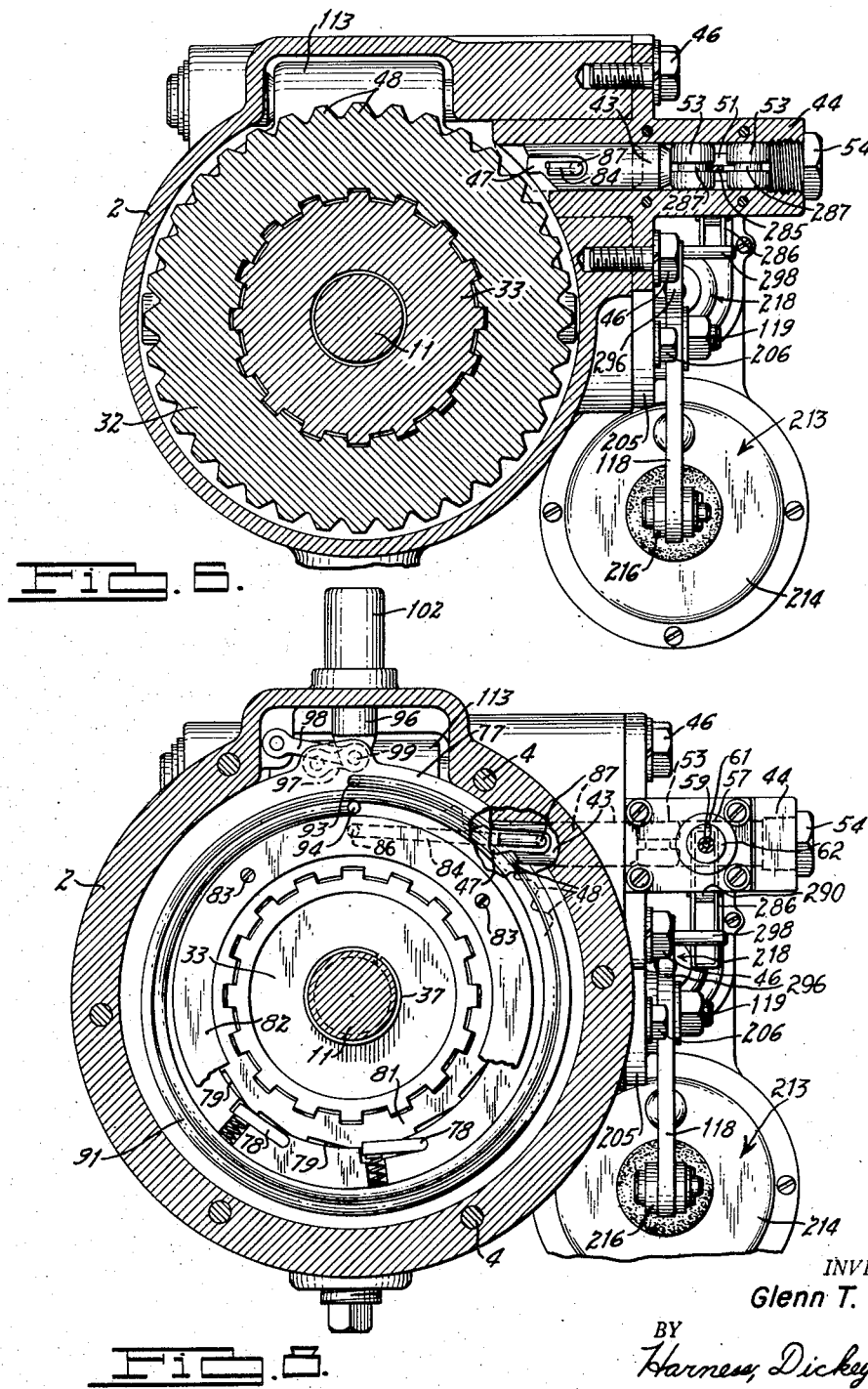

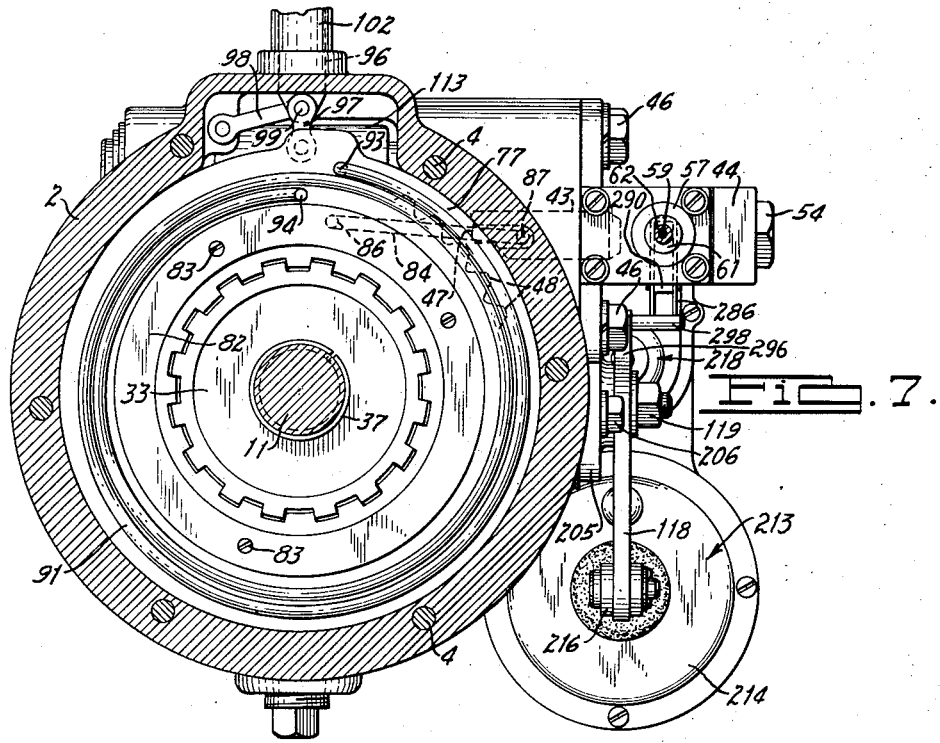
Fig. 7.
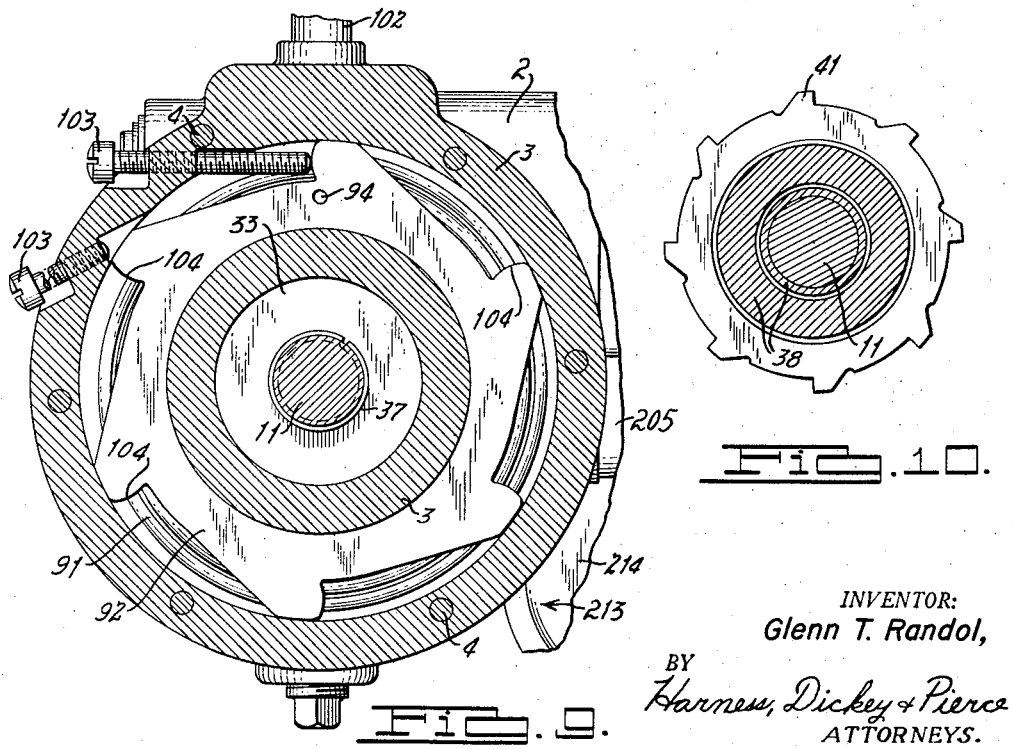
Fig. 9.
Fig. 10.
INVENTOR:
Glenn T. Randol,
BY
Harness, Dickey & Pierce
ATTORNEYS.

Aug. 14, 1956          G. T. RANDOL          2,758,683
AUTOMOTIVE TRANSMISSION CONTROL SYSTEM AND MECHANISM
Original Filed Aug. 3, 1948          17 Sheets-Sheet 6
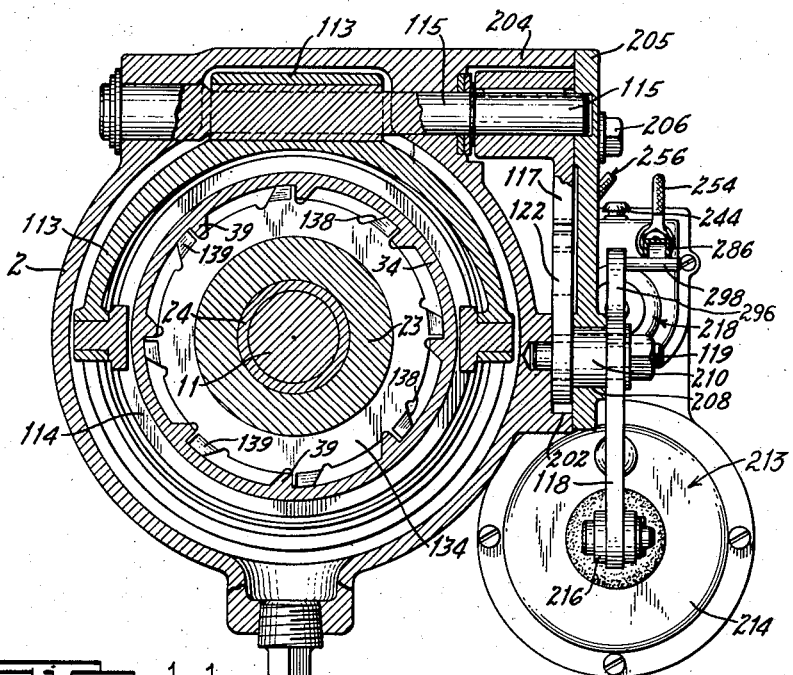
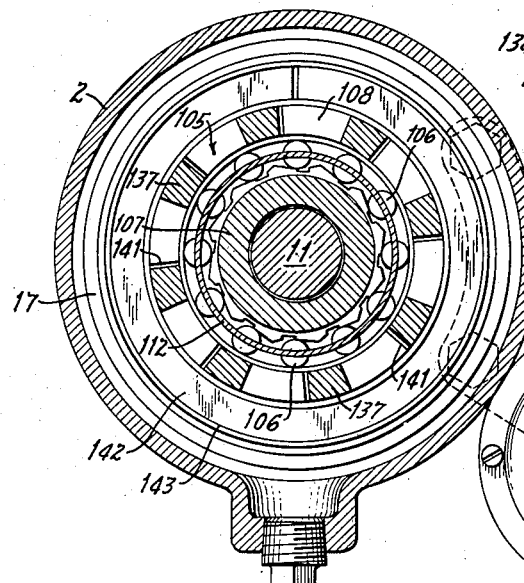
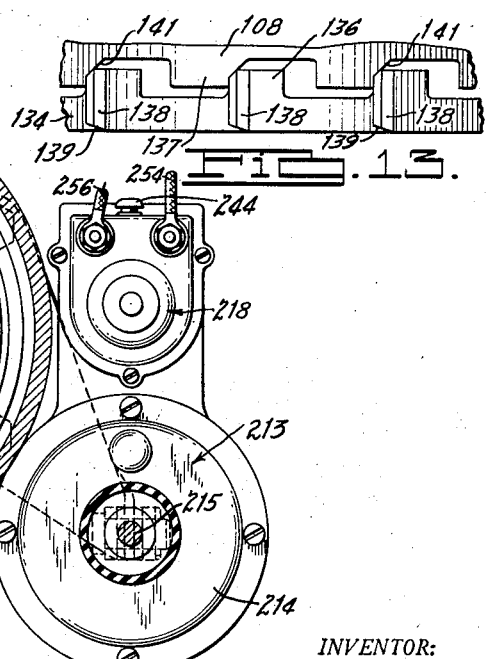
INVENTOR:
Glenn T. Randol,
BY
Harness, Dickey & Pierce
ATTORNEYS.

Fig. 14.
OVERDRIVE

Overdrive brake engaged
Direct drive clutch disengaged.
Brake rotor and sun gear engaged

- Orbit gear
- Pinion carrier rotation
- Sun gear torque (forward)
- Sun gear brake rotor

Fig. 15.
CHANGE FROM OVERDRIVE TO DIRECT (DRIVING LOAD)

Overdrive brake disengages
Direct drive clutch engages.
Brake rotor disengages from sun gear

- Orbit gear
- Sun gear torque (forward)
- Sun gear brake rotor

Fig. 16.
DIRECT DRIVE

Overdrive brake disengaged
Direct drive clutch engaged.
Brake rotor disengaged from sun gear

- Orbit gear
- Sun gear rotation (forward)
- Sun gear brake rotor

Fig. 17.
CHANGE FROM DIRECT TO OVERDRIVE (COASTING LOAD)

Overdrive brake engages
Direct drive clutch disengages
Brake rotor disengages from sun gear

- Orbit gear
- Sun gear torque (reversed)
- Sun gear brake rotor

INVENTOR:
Glenn T. Randol,
BY
Harness, Dickey & Pierce
ATTORNEYS.

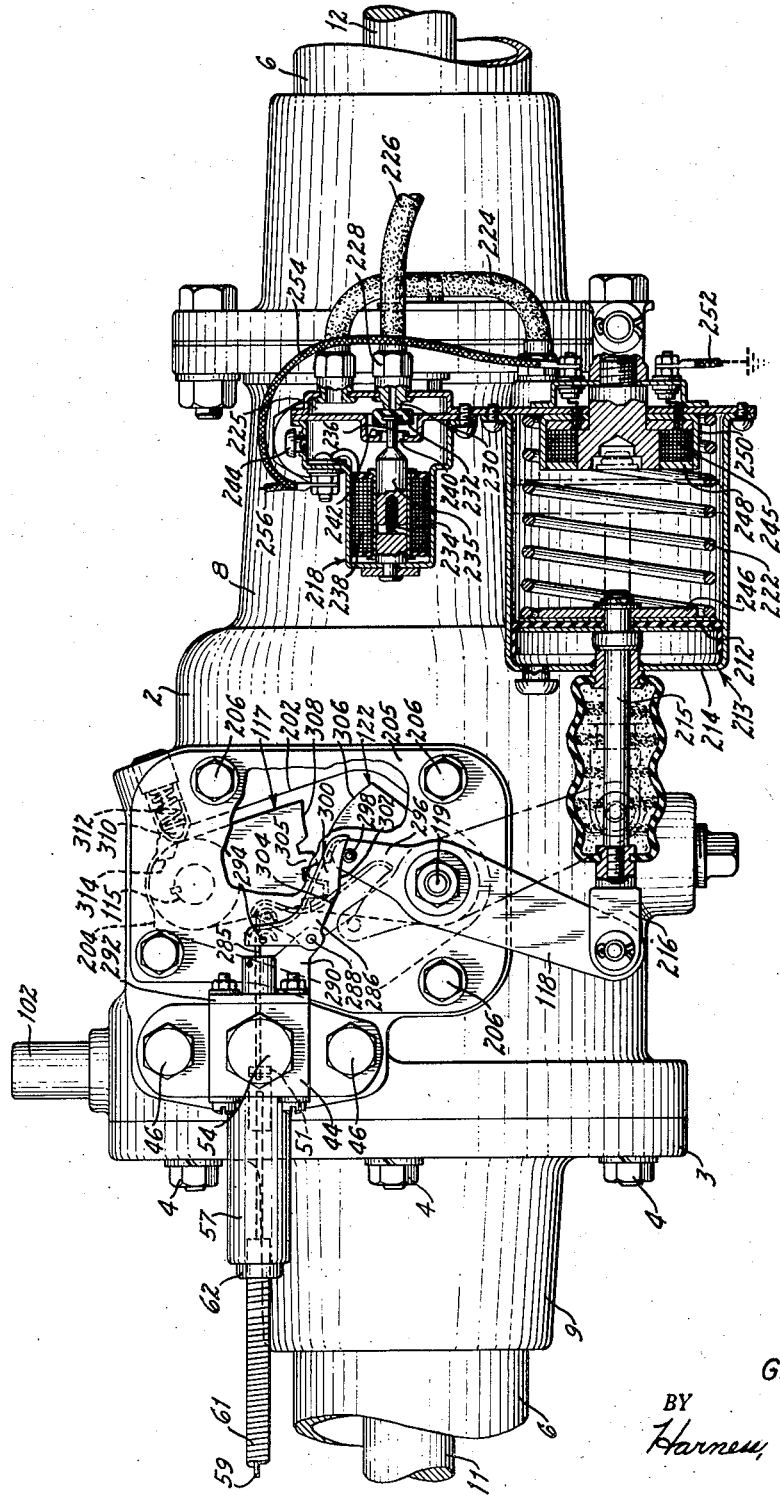

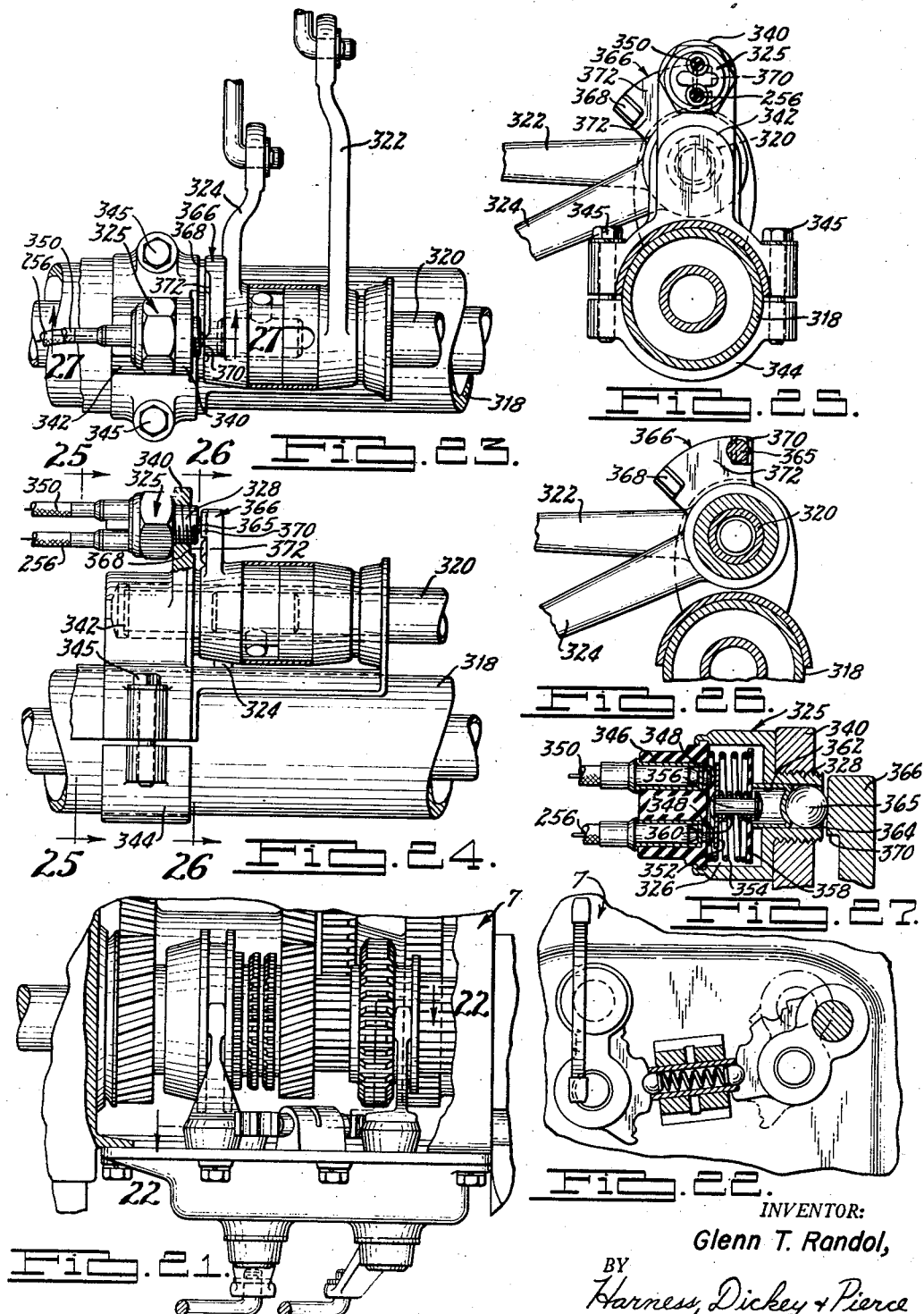

Aug. 14, 1956  G. T. RANDOL  2,758,683
AUTOMOTIVE TRANSMISSION CONTROL SYSTEM AND MECHANISM
Original Filed Aug. 3, 1948  17 Sheets-Sheet 10
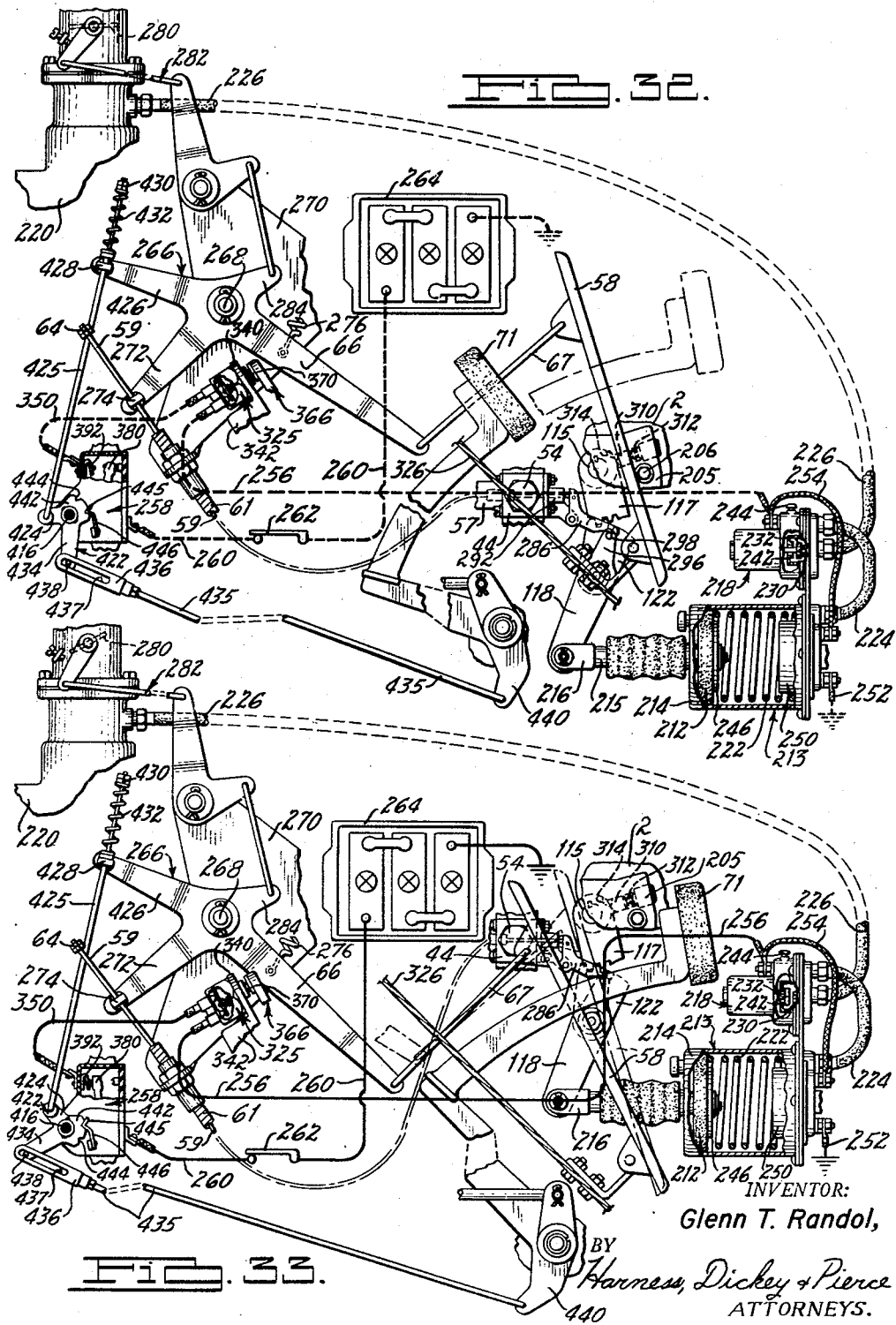
INVENTOR:
Glenn T. Randol,
BY Harness, Dickey & Pierce
ATTORNEYS.

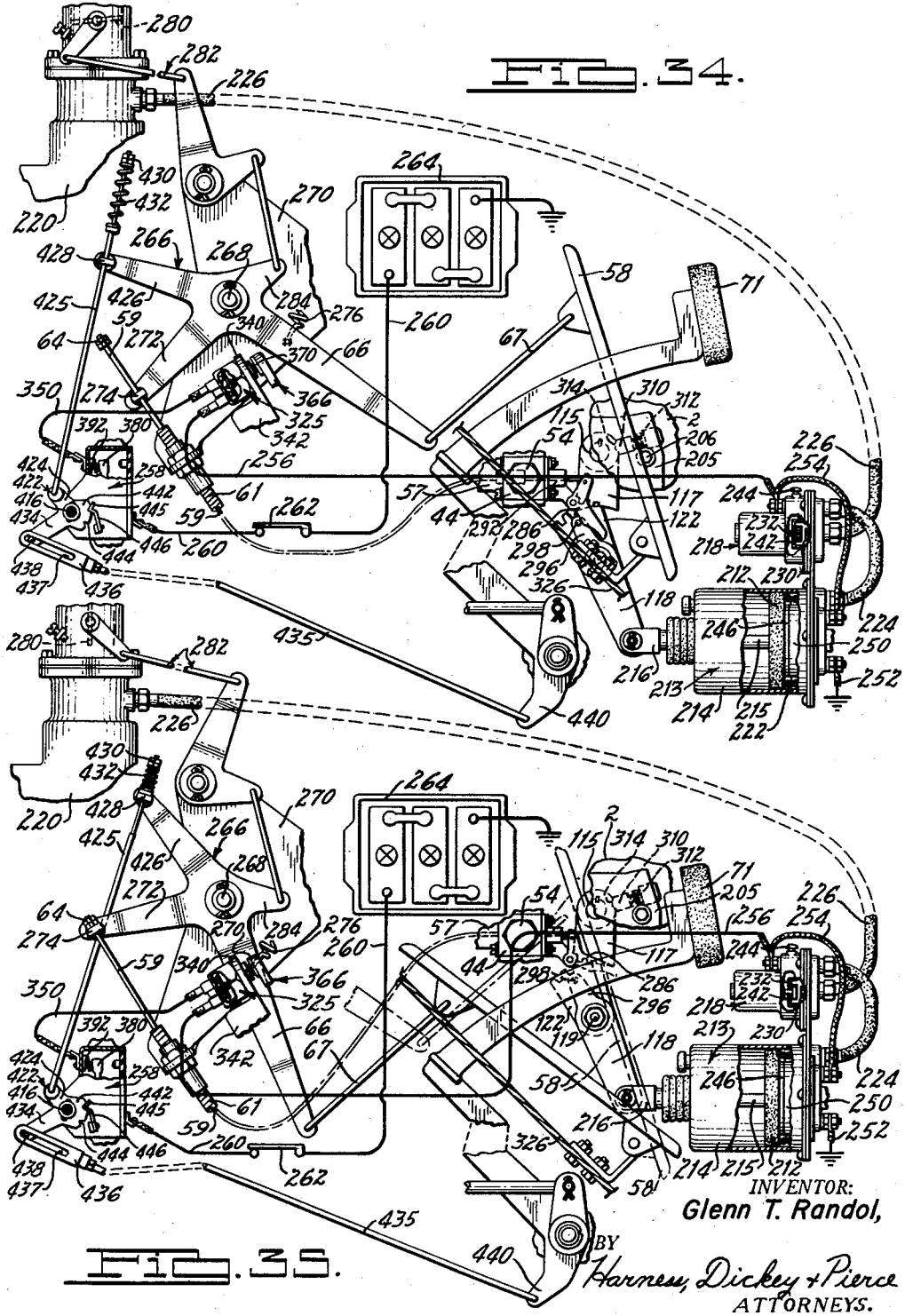

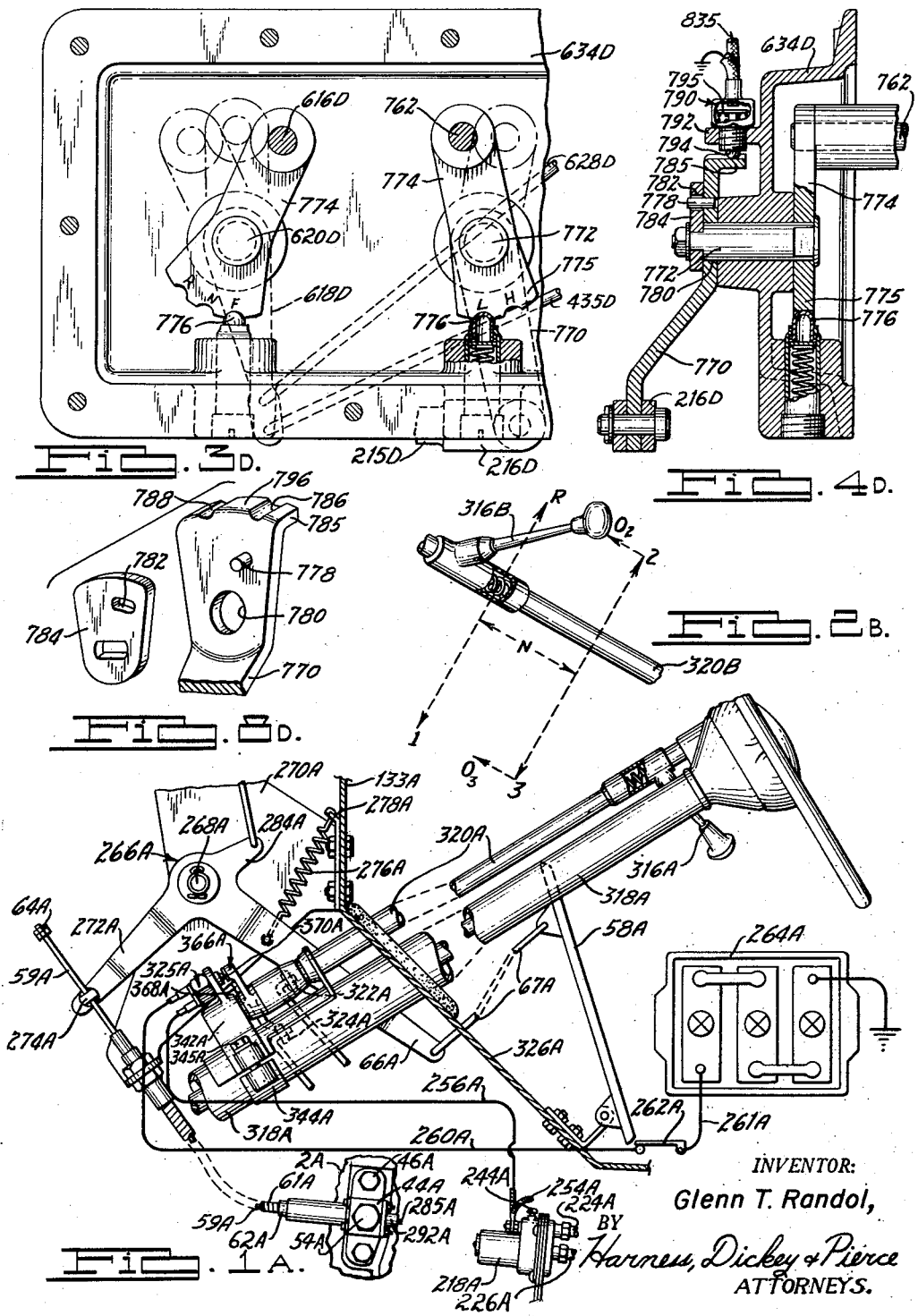

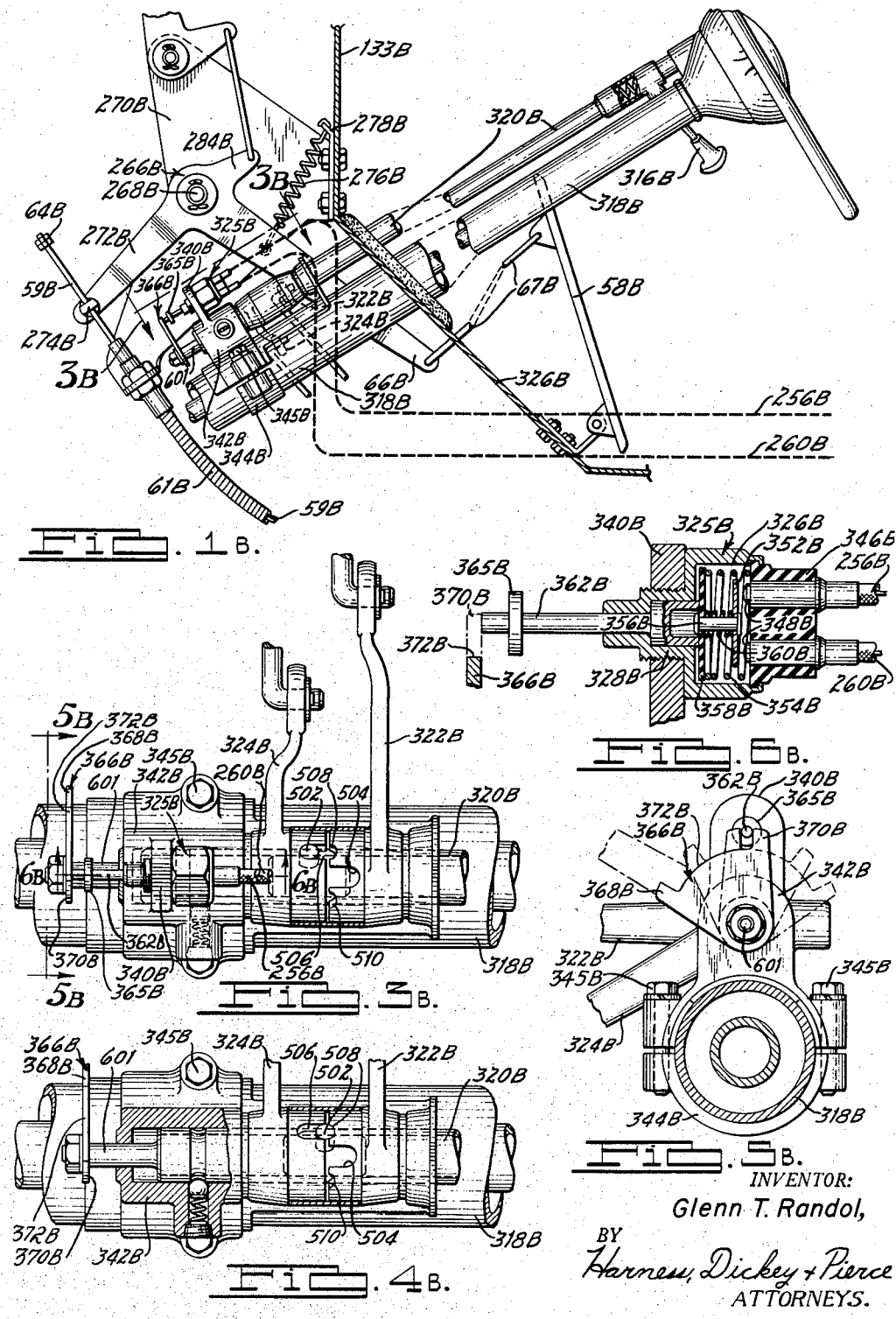

Aug. 14, 1956  G. T. RANDOL  2,758,683
AUTOMOTIVE TRANSMISSION CONTROL SYSTEM AND MECHANISM
Original Filed Aug. 3, 1948  17 Sheets-Sheet 14
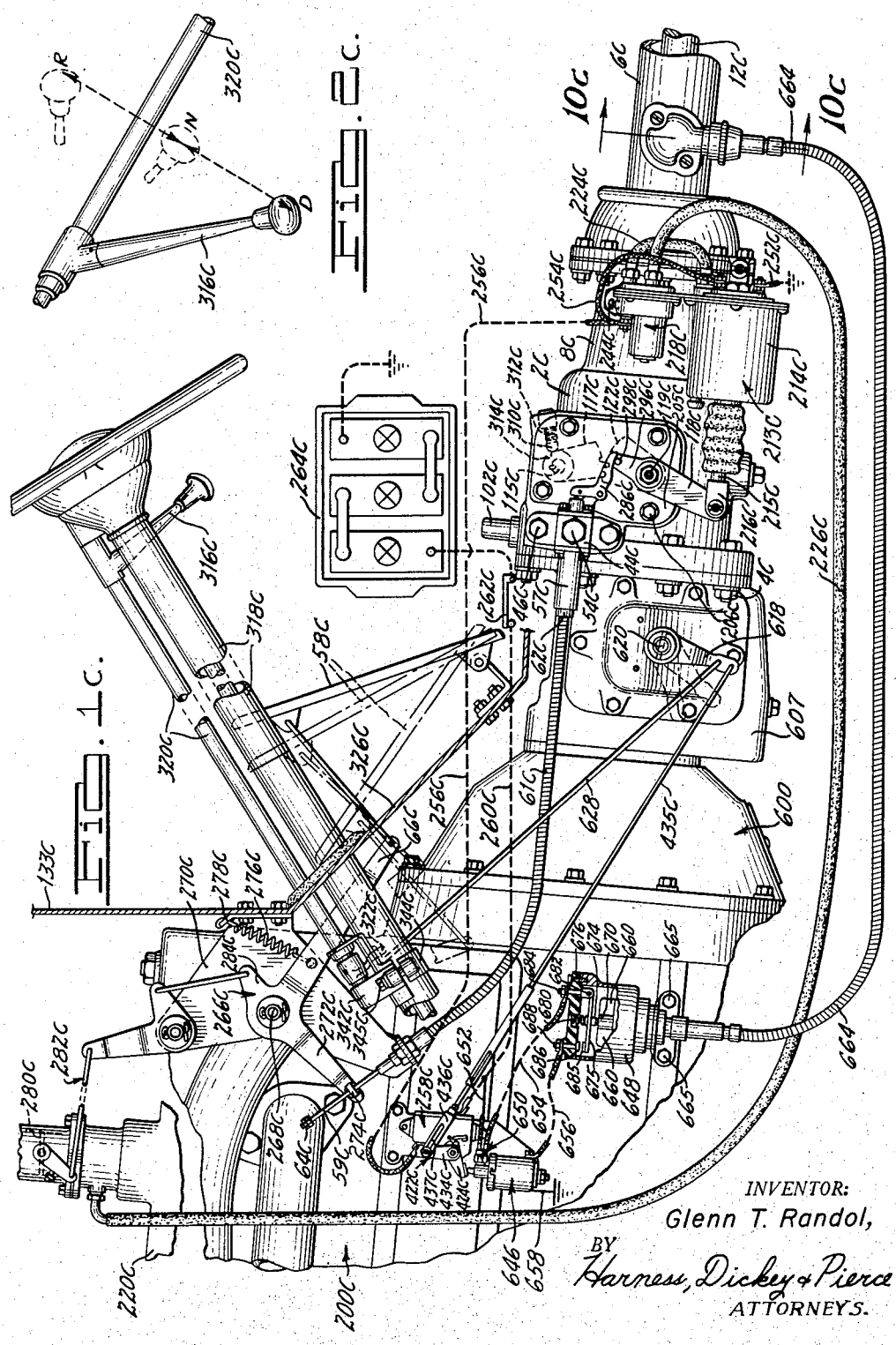
INVENTOR:
Glenn T. Randol,
BY
Harness, Dickey & Pierce
ATTORNEYS.

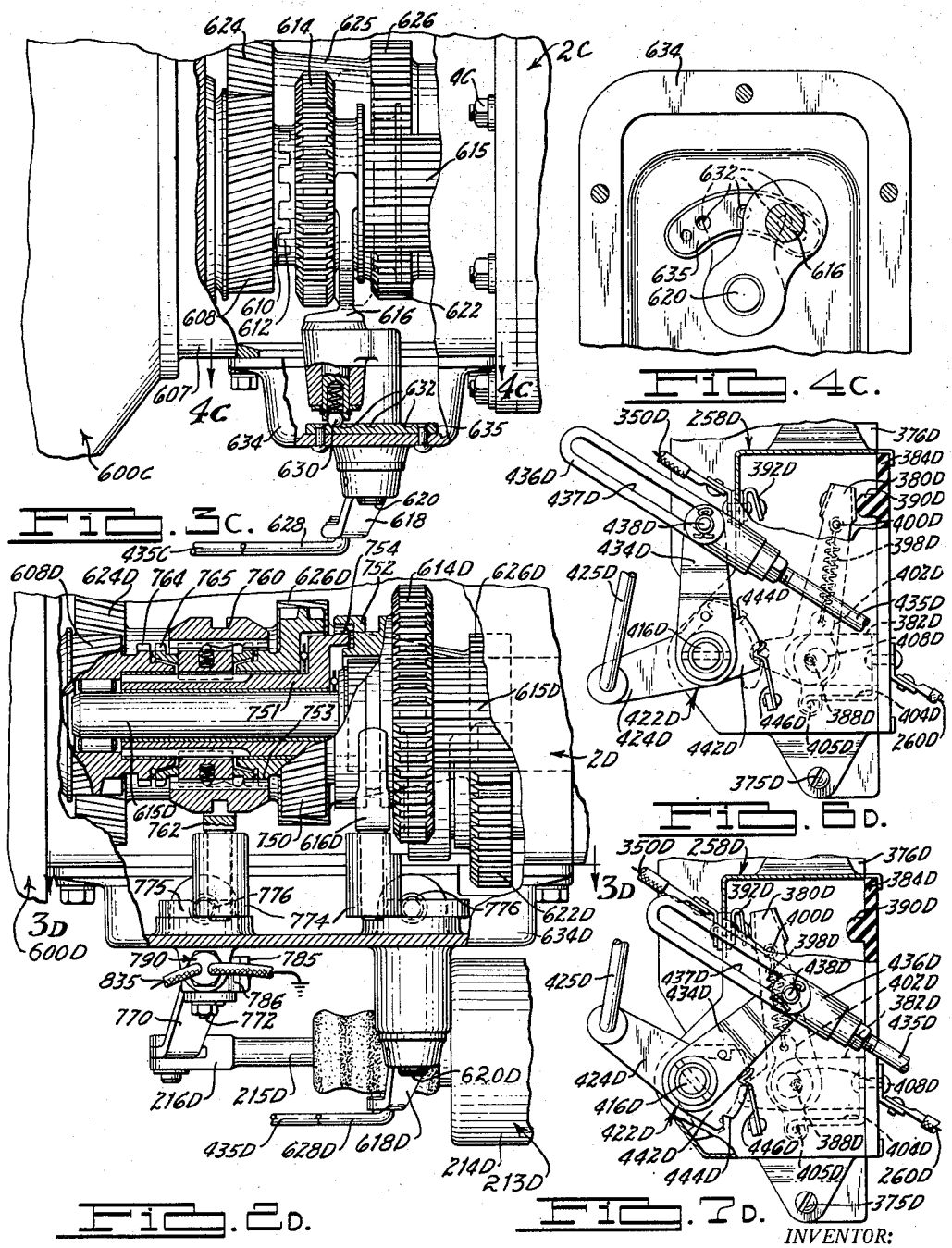

Aug. 14, 1956 G. T. RANDOL 2,758,683
AUTOMOTIVE TRANSMISSION CONTROL SYSTEM AND MECHANISM
Original Filed Aug. 3, 1948 17 Sheets-Sheet 16
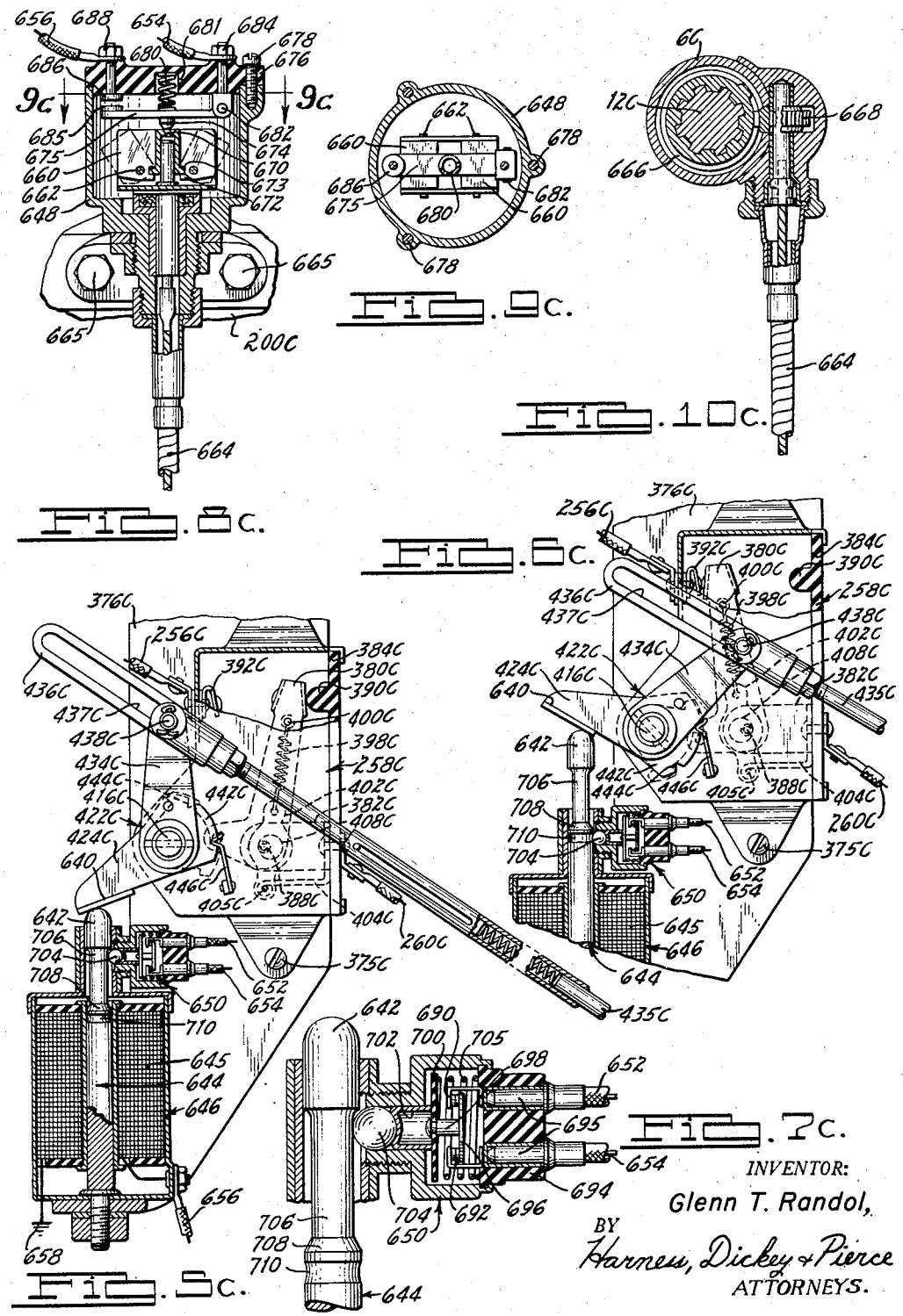
INVENTOR:
Glenn T. Randol,
BY
Harness, Dickey & Pierce
ATTORNEYS.

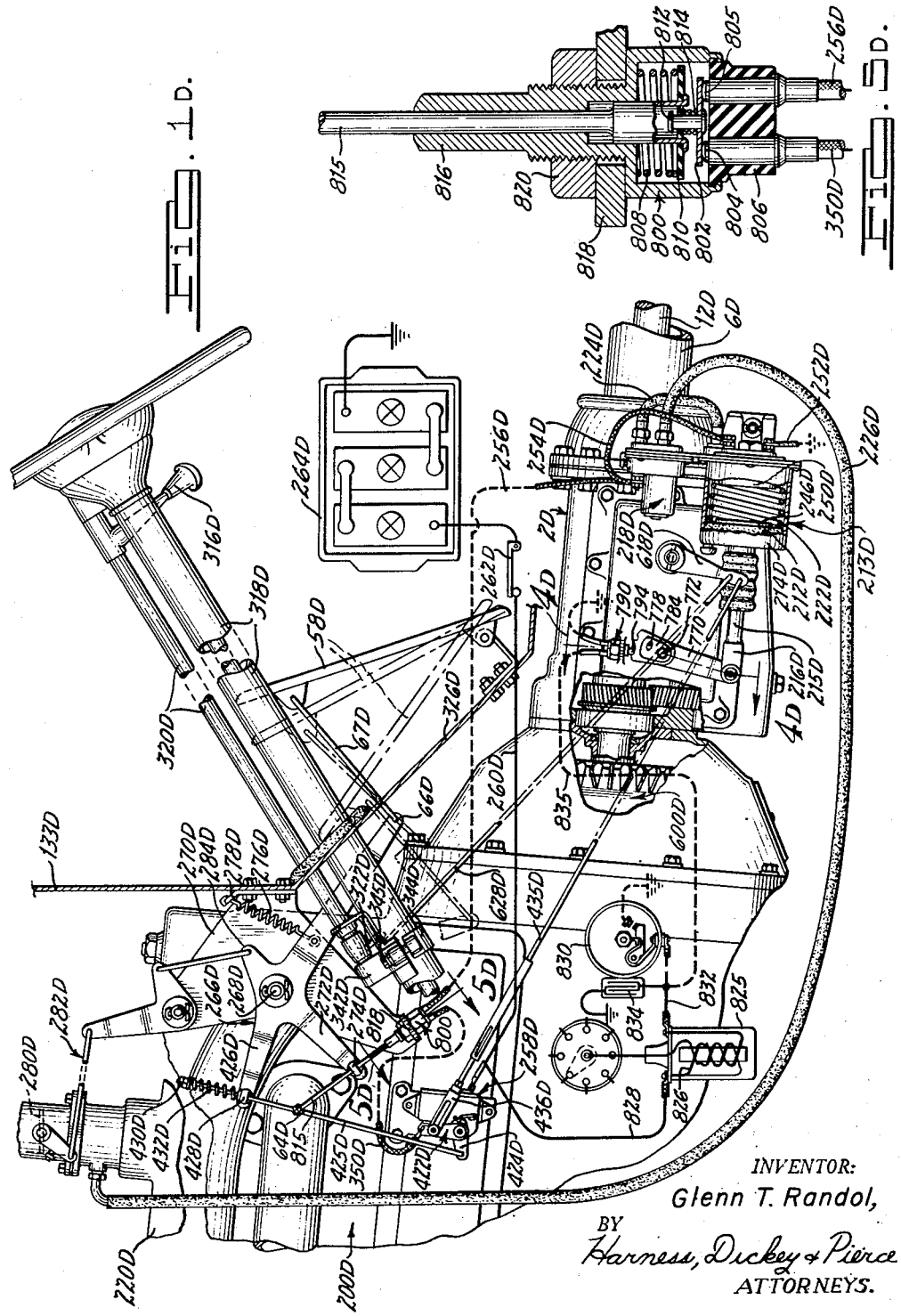

United States Patent Office 2,758,683
Patented Aug. 14, 1956

2,758,683

AUTOMOTIVE TRANSMISSION CONTROL SYSTEM AND MECHANISM

Glenn T. Randol, Mountain Lake Park, Md.

Continuation of application Serial No. 42,174, August 3, 1948. This application January 26, 1953, Serial No. 333,145

92 Claims. (Cl. 192—.048)

The present invention relates to control systems for change-speed gearing, and particularly to improvements relating to the control of transmission devices for motor vehicles. This application is a continuation of my prior co-pending application Serial No. 42,174, filed August 3, 1948, for Automotive Transmission Control, now abandoned.

The invention finds particular utility in connection with automotive transmission systems having at least two distinct torque ratios or drives, where the shifting between such ratios is induced by power means and/or centrifugal force or the like, but wherein the driver is afforded supervisory control over the action of the shifting means. Such transmissions are sometimes referred to as semiautomatic transmissions, as distinguished from fully automatic transmissions wherein ratio changing is not under the direct control of the driver. The present invention aims to provide improved means whereby the action of a self-shifting transmission system may be definitely and accurately controlled by the driver without the use of any special or nonstandard control devices and, in fact, with the use of no control devices other than the conventional control elements such as the gear shift lever and clutch pedal, and/or accelerator pedal mechanism, commonly provided upon motor vehicles having manually-shifted transmissions. In accelerating a vehicle equipped with my improved system, a lower speed (higher torque) gear ratio may be maintained as long as the driver desires, and shifting only occurs at the election of the driver in response, for example, to momentary release of the accelerator pedal. Such transmissions have the advantage that no compromises are necessary in the selection of speeds or speed ranges at which shifting will occur, and the driver may demand and secure maximum car performance if he desires, whereas with fully automatic transmissions compromises must be made in the selection of ratio changing speeds, due to such consideration as engine noise, with resultant sacrifice of maximum car performance. It is an important object of the present invention to provide a control system for a transmission of the indicated character which provides effective driver supervision of the self-shifting action without requiring the driver, in order to exercise such supervision, to actuate any special or unorthodox controlling agencies whatever, or to move the standard control devices in any unnatural or unusual manner. Thus, as indicated, a vehicle equipped with my improved system may incorporate a conventional accelerator pedal and a conventional hand-shift lever with their respective mechanical linkage, mounted, for example, on the steering column and movable in a standard or conventional pattern, and the improved controlling system of my present invention is so interrelated with these standard control elements that the automatic shifting action may be controlled or supervised without the necessity for any unusual movements of such standard controls and without the manipulation of any other control means whatever. An advantage of my invention, therefore, is that in an emergency, when the driver may not have time to think or to reach for a special control, his already-learned reactions (which with an experienced driver result in quick and spontaneous actuation of the standardized controls) will cause my improved system to function in a safe and proper manner.

It is also an object of this invention to provide a control system of the indicated character wherein a high speed, low torque range may in effect be locked out whenever desired, in a very simple manner, without requiring the manipulation of special controlling agencies such as the special lock-out cables or lock-out shifting means commonly employed in conjunction with automatic overdrive units and semi-automatic transmissions, and automatic transmissions as frequently constructed. In the latter connection, it will be recognized that the principles of the invention are also useful in connection with fully automatic transmissions where a manual control has been considered necessary to engage and disengage an "emergency low" range, or to select between two driving ranges.

Still another object of this invention is to provide an improved control system of the indicated character which is simple, reliable, inexpensive, easily installed, and the principal components of which are readily accessible and replaceable if such servicing should become necessary.

A still further and important object of the present invention is the provision of novel conditioning means actuated by the engine accelerator mechanism for controlling the effectiveness of differential fluid pressures for operating the transmission servo-mechanism whereby operation of the accelerator mechanism from engine idling position is effective to enable such pressure differential conditions to energize the servo-mechanism at reduced effectiveness insufficient to operate the servo-mechanism to change the effective drive ratio of the transmission, while release of the accelerator mechanism back to idling position causes maximum pressure differential conditions sufficient to operate the servo-mechanism without additional operation of said means being required.

A more specific object related to the last stated object above is the provision in such novel conditioning means of a switch device controllable by the accelerator mechanism for causing two-stage energization of the servo-mechanism responsive to depressing and release of the accelerator respectively, to cause immediate full operative energization of the servo-mechanism to upshift the transmission drive upon the accelerator release while accommodating use of a selected manually-operated transmission drive during the depressing phase of the accelerator without interrupting the progressive energization of the servo-mechanism aforesaid following operation of the switch device to inaugurate such energization.

Another object of the present invention is to provide improved controlling means for transmission systems of the indicated character, which controlling means is so constructed and arranged that not only may the different driving ranges be selectively employed whenever the driver wishes, but the transmission drive-mechanism may be so constructed as to provide either a "free-wheeling" or a positive two-way underdrive, which latter drive affords engine braking while operating the vehicle in overdrive range, in accordance with the driver's wishes or the driving condition encountered; while in addition, a forced or automatic downshift to such lower drive is effected in response to a predetermined depressing movement of the accelerator pedal means or a governor device responsive to reduction in vehicular speed to a certain factor, respectively.

A more specific object of the invention is to provide improved controlling means for automatic or semi-automatic overdrive units including, without limitation thereto, overdrive units of the general type disclosed in Taylor Patent No. 2,398,814 granted April 23, 1946.

The invention consists of the novel constructions, arrangements and devices to be hereinafter described and claimed for carrying out the foregoing general statement of the nature of my invention, and such other objectives, features, and advantages as will appear in lieu of presenting them categorically in the above statement, from the following detailed description considered in conjunction with certain preferred embodiments illustrated in the accompanying drawings, wherein:

Figure 1 is a partially diagrammatic side elevational view of an overdrive unit and control system components therefor incorporating the principles of the present invention, showing adjacent and interrelated parts of a motor vehicle in which the installation is incorporated, parts being broken away, and shown in high gear (direct drive) condition with the engine clutch fully engaged, the vehicle operating at an engine idling speed (accelerator pedal released), and wherein the electrical control circuits are depicted in solid lines to indicate energized condition thereof.

Figs. 2, 3 and 4 are horizontal sectional views of the overdrive reaction brake locking mechanism, taken substantially on the line 2—2 of Fig. 1 and looking in the direction of the arrows, the parts being shown in various operative positions and on a larger scale than in Fig. 1;

Fig. 5 is a vertical longitudinal sectional view taken axially through the overdrive unit and wherein the rotor brake bar is disengaged and the shiftable lock-out clutch collar in direct-drive position as shown in Fig. 1;

Figs. 6 and 7 are cross-sectional views taken substantially on the lines 6—6 and 7—7 respectively of Fig. 5 and looking in the direction of the arrows;

Fig. 8 is a cross-sectional view similar to Fig. 7 but showing the rotor brake bar engaged, a condition effective upon release of the accelerator pedal substantially at or above a predetermined vehicle speed while the lock-out clutch collar is in overdrive position;

Fig. 9 is a cross-sectional view taken on the line 9—9 of Fig. 5 showing details of the torsional spring anchor plate;

Fig. 10 is a sectional elevational detailed view showing a floating member of a free wheeling clutch employed in the overdrive unit;

Figs. 11 and 12 are sectional views taken substantially on the lines 11—11 and 12—12 respectively of Fig. 5 and looking in the direction of the arrows;

Fig. 13 is a fragmentary developed plan view taken substantially as indicated by the arrow 13 of Fig. 5;

Figs. 14, 15, 16 and 17 are diagrammatic sectional views of the planetary gearing and related lock mechanism for the reaction gear of the gearing, progressively indicating the functioning of the gearing components during the transmission of drives of different ratios;

Fig. 18 is a side elevational view of the overdrive unit showing in vertical section the principal parts of the toothed-escapement shifting mechanism;

Fig. 19 is a view similar to Fig. 18 in a smaller scale and showing the positions assumed by the parts during medial spring movement of the servomotor piston, wherein the rotor brake bar release has been effected prior to a shift of the clutch collar to lock-out direct drive position;

Fig. 20 is a diagrammatic perspective view of the gear shifting hand lever and adjacent parts;

Fig. 21 is a fragmentary plan view, with a part of the cover broken away, of the underdrive transmission mechanism shown in high gear established condition;

Fig. 22 is an enlarged view taken substantially on the line 22—22 of Fig. 21, looking in the direction of the arrows and showing details of the shifting forks and associated interlocking mechanism carried on the interior of the transmission cover;

Fig. 23 is an enlarged plan view taken substantially from the line 23—23 of Fig. 1, looking in the direction of the arrows, of the shifting arms and associated electrical switch mechanism mounted at the lower end of the shifter control shaft;

Fig. 24 is an elevational view taken at right angles to Fig. 23;

Figs. 25 and 26 are sectional views taken substantially on the lines 25—25 and 26—26 respectively of Fig. 24 and looking in the direction of the arrows;

Fig. 27 is a sectional view taken substantially on the line 27—27 of Fig. 23 and looking in the direction of the arrows;

Fig. 28 is a vertical sectional view of an electric conditioning switch and adjacent parts of its operating mechanism, with some components shown in elevation;

Fig. 29 is a view similar to Fig. 28 showing the switch parts in another position assumed during operation;

Figs. 30 and 31 are sectional views taken substantially on the lines 30—30 and 31—31 respectively of Fig. 28 and looking in the direction of the arrows;

Figs. 32, 33, 34 and 35 are diagrammatic views similar to Fig. 1, but with certain components omitted and showing parts of the controlling mechanism in different positions they occupy during operation, and wherein the electrical control circuits are depicted in solid and dashed lines to indicate respectively energized and non-energized conditions thereof;

Fig. 1A is a partly diagrammatic side elevational view generally similar to Fig. 1 but showing a modified arrangement;

Fig. 1B is a similar view showing another modified arrangement, and wherein the electrical control circuits are depicted in dashed lines to indicate non-energized condition thereof;

Fig. 2B is a partly diagrammatic elevational view similar to Fig. 20, showing a gear shifting hand lever suitable for use with the embodiment of Fig. 1B and indicating the shifting pattern thereof;

Fig. 3B is an enlarged plan view partly broken away, taken substantially from the line 3B—3B of Fig. 1B and looking in the direction of the arrows;

Fig. 4B is a view similar to Fig. 3B but with additional parts broken away and shown in section and with some of the parts in different position;

Figs. 5B and 6B are sectional views taken substantially on the lines 5B—5B and 6B—6B, respectively, of Fig. 3B and looking in the direction of the arrows;

Fig. 1C is a view similar to Fig. 1 showing another modification;

Fig. 2C is an elevational view corresponding to Fig. 20, showing the shifting pattern of the hand lever incorporated in the embodiment of Fig. 1C, and wherein the electrical control circuits are depicted in dashed lines to indicate non-energized condition thereof;

Fig. 3C is a plan view, with parts broken away and shown in section, of gearing incorporated in the embodiment of Fig. 1C;

Fig. 4C is a fragmentary sectional elevational view taken substantially as indicated by the line 4C—4C of Fig. 3C, and looking in the direction of the arrows;

Fig. 5C is an enlarged sectional elevational view of a conditioning switch of the control mechanism incorporated in the embodiment of Fig. 1C;

Fig. 6C is a view similar to Fig. 5C of a part of the mechanism shown in the last-mentioned view, with the parts in different positions which they assume during operation;

Fig. 7C is an enlarged sectional view of a supplemental switching device incorporated in the embodiment of Fig. 1C and forming part of the control mechanism shown in Figs. 5C and 6C;

Fig. 8C is a sectional elevational view of a speed responsive governor and associated electrical switching means;

Fig. 9C is a cross-sectional view taken substantially on the line 9C—9C of Fig. 8C;

Fig. 10C is a sectional elevational view of the driving means for the speed governor, taken on the line 10C—10C of Fig. 1C;

Fig. 1D is a view similar to Fig. 1 showing another modification and wherein the electrical control circuits are depicted in solid and dashed lines to indicate respectively energized and non-energized conditions thereof;

Fig. 2D is a plan view partly broken away showing gearing incorporated in the embodiment of Fig. 1D and other associated elements;

Fig. 3D is an enlarged interior view taken substantially on the line 3D—3D of Fig. 2D, of the gearing cover assembly, showing details of the two shifter forks and position-holding detent mechanism therefor;

Fig. 4D is a sectional view taken substantially on the line 4D—4D of Fig. 1D and looking in the direction of the arrows;

Fig. 5D is an enlarged sectional view taken substantially on the line 5D—5D of Fig. 1D and looking in the direction of the arrows;

Fig. 6D is an enlarged elevational view, partly broken away, of a conditioning switch construction employed in the embodiment of Fig. 1D;

Fig. 7D is a view similar to Fig. 6D showing the parts in different positions assumed during operation; and Fig. 8D is a perspective view of portions of a switch actuating structure incorporated in the embodiment of Fig. 1D.

*Control system mechanism associated with an overdrive unit (Figures 1–35)*

The overdrive unit shown in Figs. 2–17 inclusive substantially corresponds to the construction disclosed in Taylor Patent No. 2,398,814 above referred to, and reference may be had to that patent for consideration of the details of construction and operation of such overdrive unit, which in and of itself forms no part of my present invention, apart from the manner in which it is interrelated with components of the control system presently to be described. This unit may also be properly termed in a broader patent sense, a supplemental transmission ratio drive means, or a two-speed power transmission or drive as the claim language may require.

The overdrive unit employs a planetary gearing, and the overdrive ratio is effective whenever the sun gear 22 of the planet system is held stationary by reaction braking mechanism.

The overdrive unit is incorporated in a housing having a body portion 2 and end plate 3 secured together by screws 4. The housing is preferably interposed in torque tube 6 of an automobile behind the regular transmission 7, with sections of the tube engaged by necks 8 and 9 on the housing body and end plate respectively. Leading portion 11 of the propeller shaft provides the drive shaft of my unit, and trailing portion 12 forms the driven shaft. When power is being transmitted through the unit from drive shaft 11 to driven shaft 12, the mechanism is subjected to a certain kind of loading which I shall refer to as a "driving load"; and when the rear wheels of the car tend to overrun the rate at which they are driven, the mechanism is subjected to a different loading which I term "coasting load"; these terms being conventional in the trade.

As shown in Fig. 5, the overdrive transmission chosen for purposes of illustration comprises a planetary gearing having a planet pinion 13 journaled on shaft 14 mounted on a pinion carrier 16 splined to drive shaft 11. Orbit ring gear 17 of the planetary system is mounted for rotation with driven shaft 12 by a hub 18 splined to the shaft and provided with a flange 19 peripherally splined to the orbit gear and held by retaining ring 21. Sun gear 22 is formed as part of a sleeve 23 freely journaled on the drive shaft on a bearing 24.

The entire mechanism is journaled in the housing by two main bearings 26 and 27. One of these is disposed about the drive shaft and is retained by end plate 3, while the other is interposed between hub 18 and neck 8 of the main housing. Hub 18 also carries speedometer gear 28; and an oil retaining ring 29 is interposed between the hub and neck behind gear 28.

Means are provided for holding the sun gear against rotation to effect planetary operation of the system for establishing an overdrive connection between the shafts. For this purpose, a brake mechanism generally indicated by reference numeral 31 is employed; the brake being engaged by reverse (counterclockwise) torque of the sun gear under coasting load, and disengaged by forward (clockwise) torque of the sun gear under driving load. In the present specification, the references to direction of rotation and torque (clockwise and counterclockwise) are taken as viewed from the left in Fig. 5; the clockwise rotation being considered as forward in the conventional manner.

Brake 31 for establishing the overdrive connection comprises a peripherally toothed rotor 32 splined to a hub 33 connectable to sun gear sleeve 23 through a shiftable clutch member 34. Hub 33 is freely journaled on drive shaft 11 by bearing 36 and is restrained axially by retaining ring 37 and spacer bearings 38. By this arrangement, the brake rotor 32 is connected with the sun gear whenever clutch member 34 is in the dashed line position shown in Fig. 5 with its teeth 39 engaging teeth 41 and 42 respectively of the sleeve and hub.

Referring to Fig. 6, the overdrive brake further comprises a bar 43 disposed transversely of and offset from the rotor axis and axially slidable in a tubular casing 44 secured to the housing by screws 46. Brake bar 43 has a forward end 47 shaped to fit in the V-shaped notches formed between teeth 48 on rotor 32. In its extended position, the brake bar engages the toothed rotor as shown in dotted line position in Fig. 6; and in its retracted position the bar is disengaged from the rotor as illustrated in Fig. 7. It is apparent that the brake bar is disengageable by axial thrust applied on it by rotor 32 when the latter tends to turn clockwise under torque imposed by the sun gear when the unit is subjected to driving load.

Means are therefore provided for locking the brake bar against disengagement to maintain the overdrive connection. When the brake is locked up, the sun gear is thus held against clockwise rotation, and the driving thrust is transmitted by drive shaft 11 to orbit gear 17 through planet pinion 13 which, in turn, planetates about the fixed sun gear. The orbit gear thus rotates forwardly at a faster rate than the drive shaft, and this is reflected by increased speed of driven shaft 12 in accordance with the usual planetary overdrive principle.

As illustrated in Figs. 2 and 6, the locking means comprises a plunger 51 slidable within a transverse neck portion 52 of casing 44. When the plunger is extended, it lies between a pair of rollers 53 interposed between the end of brake bar 43 and a fixed reactor element or plug 54 threaded in the end of casing 44. In other words, when plunger 51 is inserted between the rollers, the overdrive brake is locked against disengagement. The locking plunger is normally urged toward extended position by a spring 56 interposed between the plunger and the outer end wall 57 of neck 52.

Means associated with a throttle pedal 58 (Fig. 1) is provided for retracting lock plunger 51 to accommodate disengagement of the overdrive brake. A pull wire 59 attached to the plunger is carried forward in a protective sheath 61 secured at its rear end to cap 57 by a clamp 62 and terminating under and forwardly of the driver's compartment where the wire is provided with a stop 64 engageable by an eye 274 pivotally carried by an arm 272 of a star lever 266 actuatable by the throttle actuator or accelerator pedal through the agency of a link 67 which connects the pedal to another arm 66 of the star lever. Stop 64 is normally spaced ahead of eye 274 so wire 59 is pulled to start retraction of plunger 51 at the end of the throttle stroke when pedal 58 is fully depressed. Rollers 53 permit the plunger to be pulled out easily against the axial thrust imposed on brake bar 43 by the sun gear torque. The normal operation of the throttle pedal is not interfered with as the plunger need be retracted by the throttle treadle 58 only just enough to allow a roller 53 to move under the inclined face of the plunger, whereupon the axial thrust of bar 43 lifts the plunger to the partially retracted position shown in Fig. 4. With the brake thus disengaged, the unit is free to go into direct drive.

Means are also provided to unlock the brake to accommodate disengagement thereof when the regular clutch pedal 71 is depressed to slow up the car or shift gears. This means will presently be described. The cable 59 does not pull plunger 51 all the way back to the limit of the retractile movement of the plunger in response to flooring of the accelerator pedal, but the electropneumatic actuating means which retracts the plunger in response to actuation of the clutch pedal moves such plunger farther back, and means are provided for latching plunger 51 in such fully retracted position. As seen in Fig. 3, a latch plate 72 is pressed forwardly under a shoulder of the plunger by a spring 73, thus holding the plunger retracted even though the clutch pedal has moved back. The brake bar 43 is now free to retract whenever a clockwise torque is put on the brake rotor by the sun gear, so that the unit can go into direct drive.

Upon retraction of brake bar 43, it kicks over a pivoted finger 74 to disengage latch plate 72 and allow spring-pressed plunger 51 to rest on one of rollers 53 as shown in Fig. 4. The plunger with its tapered nose 76 is now ready for reinsertion between the rollers whenever the brake bar is again extended.

Means are provided for extending bar 43 to re-engage brake rotor 32 when the latter turns counterclockwise under reverse torque of the sun gear occasioned by a coasting load on the unit. As illustrated in Figs. 5, 7 and 8, an annular plate 77 is connected for counterclockwise turning with rotor 32 by spring-pressed ratchets 78 mounted on the inner periphery of the plate and engaging ratchet teeth 79 formed on a ring 81 splined to rotor hub 33. Retainer rings 82 secured on opposite sides of plate 77 by bolts 83 serve to hold the parts together.

Plate 77 is, in turn, connected to brake bar 43 by a link 84. This link lies between the plate and rotor as seen in Fig. 5, and preferably comprises a rod having outturned ends 86 and 87 to form pivotal engagements with the plate and brake bar respectively. In order to make room for the link alongside bar 43, a side of the latter is preferably flattened or cut away as shown in Fig. 6. Fig. 7 illustrates the position of the parts when the brake bar is disengaged; and Fig. 8 shows the relationship after plate 77 has turned counterclockwise to pull the brake bar back into engagement with rotor 32.

Means are provided to insure full engagement and disengagement of brake bar 43. In the preferred construction, a torsional spring 91 is interposed between brake actuating plate 77 and an anchor plate 92 mounted on end plate 3 of the housing. This spring has outturned ends 93 and 94 for engaging plates 77 and 92 respectively. In the brake engaged position of the parts, as shown in Fig. 8, the torsional spring exerts a force of about 33 lbs. clockwise on plate 77; and in the brake disengaged position, the spring force is about 30 lbs. clockwise.

Opposing this force is a spring-pressed toggle device comprising a slidable arm 96 pivotally connected to plate 77 by a short link 97, so that the link moves between the collapsed position of Fig. 8 and the extended position of Fig. 7. A guide arm 98 is connected between the housing and elbow pin 99 of the toggle; there being sufficient play at the joint to allow for the straight line motion of arm 96. Fig. 5 shows that arm 96 is tubular in form to receive spring 101, which is interposed between the arm and a thimble 102 in which the arm is slidably mounted. In the brake engaged position, spring 101 acting on the full lever arm of link 97 exerts a force of about 36 lbs. counterclockwise on plate 77, thus providing a resultant counterclockwise force of about 3 lbs. tending to hold the brake bar engaged.

In the disengaged position shown in Fig. 7, the extended link 97 is about 1½ degrees over center, imparting a force of about 1½ lbs. clockwise and acting with torsional spring 91 to produce a resultant of about 31½ lbs. clockwise tending to hold the brake bar disengaged. Thus, at the beginning of the brake engaging operation, a counterclockwise turn of less than 3 degrees throws the toggle link over center, and thereafter the toggle device acts with increasing force against the torsional spring (thus reducing the applied effort required to engage the brake) until finally the torsional spring force is overcome by the toggle mechanism. This arrangement insures that any torque sufficient to start the brake engaging movement is enough to complete it.

Means are provided for adjusting the tension of torsional spring 91. Referring to Fig. 9, a pair of adjusting screws 103 are provided on end plate 3 of the housing to engage ears 104 on the periphery of anchor plate 92. These parts are so arranged that by alternately turning up and backing off the screws, the anchor plate may be turned any required amount, depending upon the spring tension desired.

From the preceding description of the brake mechanism, it is apparent that with the brake unlocked it will disengage to release the sun gear under the torque conditions imposed by a driving load. In order to establish a direct drive connection upon release of the sun gear, means are provided for locking the parts of the planetary gearing together for rotation as a unit. As shown in Figs. 5 and 12, a one-way clutch generally designated by reference numeral 105 is interposed between the sun and orbit gears. This overrunning clutch comprises rollers 106 working between an inner clutch ring 107 formed on sun gear sleeve 23, and an outer clutch ring 108 having a flange 109 peripherally splined to an end of the orbit gear and held by retaining ring 111. The clutch rollers are held by a suitable spring-pressed cage 112, and coact with flats on the inner clutch ring 107 to connect the sun and orbit gears together when the sun gear tends to run clockwise at a rate faster than the orbit gear.

The one-way clutch thus functions to lock-up the planetary gearing as soon as the sun gear is released by overdrive brake 31, because a driving load on the unit tends to spin the sun gear clockwise. Shock of clutch engagement is avoided by the inertia of brake rotor 32 and the connected parts which function as a flywheel to prevent the released sun gear from accelerating too rapidly. With this inertia load to overcome, the sun gear gradually comes up to the speed of the orbit gear, whereupon the one-way clutch engages smoothly and without clash.

Means are provided for shifting the slidable clutch member 34 to positively lock the parts of the planetary gearing together for direct drive. When member 34 is in the left-hand dashed line position shown in Fig. 5, the sun gear is connected with the overdrive brake as has already been described. By shifting the member toward the right, the brake mechanism is cut out and positive connection is established between the sun and orbit gears. Shifting is accomplished by a yoke 113 engaging an annular groove 114 in member 34. The yoke is splined to a shaft 115 journaled in the housing. A spring 222 forming a part of the clutch actuating servomotor mechanism presently to be described (Fig. 18), normally urges clutch member 34 toward the right as viewed in Fig. 5.

The actuating element for the shifter yoke 113 is in the form of a mutilated sector gear 117, the gear and yoke 113 being fast upon rock shaft 115. Sector gear 117 meshes with sector gear 122 journaled upon a stud 119 projecting rigidly from the side of the case 2. Sector gears 117, 122 are housed in a boxlike enclosure 202 defined by walls as 204 integrally cast upon and projecting laterally from the case 2, a cover plate 205 being secured over the enclosure 202 as by screws 206, the cover being provided with a journal portion 208 within which a sleeve 210 is rotatably mounted, sector gear 122 being fast upon the end of sleeve 210 within the enclosure 202, and an actuating lever 118 being fast upon the outer end of the sleeve and coupled to and actuatable by the piston 212 of the cylinder 214 of a double-acting servomotor 213. The lower end of actuating lever 118 is connected to the piston rod 215 by a clevis 216. The details of construction and operation of the sector gears 117, 122 will presently be considered. The cylinder 214 is connectable through the agency of a solenoid operated valve, generally designated 218, to a source of reduced pressure such as the intake manifold 220 of the internal combustion engine 200 which serves as the prime mover of the vehicle. The construction of the servo cylinder and magnetic valve may be essentially conventional and no detailed description thereof will be required. It will be observed that the piston 212 is normally projected by a spring 222 housed within the cylinder 214 and functions to urge the sector gear 122 in a direction to rock sector gear 117 and connected yoke 113 to the positioning in which clutch collar 34 provides the direct drive connection while movement of the collar 34 in the opposite direction is effected by differential pressures acting across the piston 212, to accommodate overdrive operations; namely, overdrive or direct drive.

A conduit 224 connects the inner end of cylinder 214 to the valve chamber 225 of solenoid valve 218, and such valve chamber is connected by a conduit 226 to the intake manifold 220. The coupling element 228 which serves to connect conduit 226 to the valve casing terminates within the chamber 225 in a valve seat portion 230 against which a relatively soft valve pad 232 is adapted to seat when urged thereagainst by the spring 234 housed within the casing 218 and reacting against the outer end thereof and against the armature 235 within which the spring is partially housed, the valve pad 232 being carried by a projecting stem portion 236 of the armature which extends into the valve chamber 225. When the solenoid, the winding of which is designated 238, is energized, the valve pad 232 is pulled away from the seat member 230 and closes an oppositely positioned vent orifice 240 which is surrounded by a seat portion 242 against which the valve pad is urged when the solenoid is energized. This will be seen to close the chamber 225 to the atmosphere and to establish communication through said chamber between conduits 224, 226 and thereby to establish communication between the cylinder 214 and the intake manifold 220. When the solenoid is de-energized, the valve pad, seating against the seat portion 230, seals the intake manifold and vents cylinder 214 to atmosphere through conduit 224, chamber 225, port 240 and a screened vent bushing 244 in the solenoid valve casing 218.

Solenoid winding 238 is connected in series with a solenoid winding 245 housed in the cylinder 214, and the two windings are accordingly arranged to be simultaneously energized and de-energized. Winding 245 is designed to coact with a plate 246 of soft iron or the like mounted upon the inner end of the piston rod 215 and forming an armature for the solenoid 245 as well as a reinforcing plate for the piston assembly 212. Plate 246 is positioned to be drawn into engagement with the core plate 248, also of soft iron or other material of low magnetic retentivity. Core plate 248 forms the inner end of the casing 250 in which solenoid winding 245 is housed.

In normal operation of the parts, the plate 246 is drawn into engagement with plate 248 when the pressure is reduced within the right-hand chamber of the servo-cylinder 214 as viewed in Fig. 18, and the solenoid 245 being energized at this time, maintains the piston in the indrawn position in which spring 222 is compressed, so long as the solenoids are energized and irrespective of subsequent variations of intake manifold pressure. The electrical connections to the solenoids are effected by the ground wire 252, conductor 254 which connects the two solenoids, conductor 256 which leads from the other terminal of solenoid 238 to one terminal of a switch assembly generally designated 258 and the operation of which will presently be considered, the other terminal of the switch 258 being connected by means of a conductor 260 and hand switch 262 to a source of current such as the vehicle battery 264.

The means for positively connecting the sun and orbit gears together when clutch member 34 is shifted to the right, as viewed in Fig. 5, includes a synchro-mesh feature. As shown in Fig. 5, a floating clutch ring 134 is interposed between sun gear sleeve 23 and part 108 which turns with the orbit gear. This floating ring is freely journaled on the sun gear sleeve and is connected for limited turning movement relative to part 108 by end teeth 136 on ring 134 loosely meshed with teeth 137 on part 108 respectively. Fig. 13 clearly shows the free play between these teeth which allows for the desired relative movement.

Floating ring 134 also has peripheral teeth 138 adapted to be engaged by the internal teeth 39 on clutch member 34 when the latter is shifted to the right. As seen in Fig. 11, teeth 39 and 138 are relatively narrow and are widely spaced circumferentially. This wide spacing will insure meshing of the teeth in most positions of the sun and orbit gears. The adjacent ends of teeth 39 and 138 are also beveled as indicated by bevels 139 on teeth 138 in Fig. 13. Should the teeth meet end on, these bevels usually will force the floating ring to turn enough to enable meshing; it being remembered that the floating ring is free to turn a limited degree relative to the shiftable member because of the loose connection with part 108.

To take care of the condition where the narrow flat end faces of teeth 39 and 138 happen to abut squarely, inclined planes 141 are provided at the bases of teeth 137 on part 108, adapted to turn floating ring 134 upon axial pressure applied to the floating ring by shiftable member 34. See Fig. 13. This turning is enough to move the flat ends of the teeth out of abutment and facilitate meshing thereof.

Lubrication of the overdrive unit is by means of oil retained in the lower portion of the housing. Oiling of the confined parts of the planetary gearing is insured by a helical impeller or screw 142 disposed between the periphery of part 108 and a hollow casing 143. This pump picks up oil from the housing and delivers it under pressure to the planetary gearing through an opening 144 in flange 109. The oil is then discharged back into the housing through an opening 146 in flange 19. Part of the oil is fed under further pressure to the planet pinion bearing 147 by a scoop ring 148 secured to the planet pinion carrier 16 and having a raised lip portion adjacent the pinion shaft to provide an opening 149 for scooping the oil and directing it into longitudinal passage 151 of the pinion shaft. A transverse passage 152 in the shaft leads to the pinion bearing.

As previously pointed out, depression of the accelerator pedal 58 all the way acts through the Bowden wire 59 to pull the plunger 51 from between the rollers 53, the accelerator pedal being connected through a link 67 to one arm 66 of a star lever generally designated 266. The star lever is pivoted on a stud 268 carried by a plate 270 attached to the front face of the fire wall 133. If the plunger 51 is between the rollers 53, depression of the accelerator pedal all the way is effective to pull the plunger free. Forward torque of the sun gear 22 under driving load, as shown in Fig. 15, then retracts bar 43 to disengage the brake and release the sun gear.

The one-way clutch 105 immediately locks the sun gear and ring gear 17 together so that the gearing rotates as a unit to produce the direct drive ratio. The unit remains in direct drive as long as there is a driving load on the parts. However, when the momentum of the car puts a coasting load on the unit, ring gear 17 tends to rotate forwardly and to overrun the sun gear 22 through the free wheeling clutch 105. This, acting through the planet pinions 13, causes a reverse torque to be exerted upon the sun gear, tending to turn the sun gear and connected brake rotor 31 in a reverse direction, as illustrated in Fig. 17. As a result, plate 77 is turned backward through ratchets 78, pulling brake bar 43 into engagement with the toothed rotor. When the sun gear is thereby stopped, pinions 13 are forced to planetate about the sun gear and re-establish the overdrive connection between the shafts. Immediately upon extension of the brake bar 43, plunger 51 reinserts itself between rollers 53 to relock the brake against disengagement.

A spring 276, hooked to a bracket 278 fastened to the firewall 133 and also reacting against the arm 66 of the star lever 266, constantly urges the accelerator mechanism toward the raised position and serves as a throttle closing spring. The operative connection between the accelerator pedal 58 and the butterfly throttle valve 280 is shown as provided through the agency of suitable linkage, generally designated 282, connecting another arm 284 of the star lever to the throttle valve.

The position of the plunger 51 is also influenced by the servomotor 213, means being provided whereby, upon a downshift from the overdrive ratio under the influence of the servomotor, the plunger 51 is first kicked from between the rollers 53 by the servomotor spring, whereafter the servomotor spring shifts the clutch collar 34 in the manner previously described. A flat link 285 is connected to the plunger 51 and extends from the opposite side of the casing 44 where it is pivotally connected to a bell crank 286 shown as fulcrumed on a pin 288 carried by a bracket 290 integral with the rear cover plate 292 of the housing 44. The bell crank 286 is shown as constructed as a hollow sheet metal stamping of U-section, opening toward the housing 44, the link 285 being hooked loosely over a cross pin 294 carried by the upper arm of the bell crank, the hooked portion of the link projecting into the interior of the hollow bell crank so that the link and bell crank may move together in both directions. The rollers 53 may be peripherally relieved or slotted as indicated at 287 to provide clearance for the link. The lower arm of the bell crank extends rearwardly beside an upwardly projecting arm 296 integral with lever 118 actuatable by the servomotor 213. A camming pin 298 fast in and projecting outwardly from the face of arm 296 is engageable with the contoured lower surface of the lower bell crank arm 300. Approximately one-half of the length of the lower edge of arm 300 is occupied by a surface 302 curved upon a radius corresponding to the distance between the pins 119, 298 and concentric with the arc of movement of the upper surface of pin 298 when the portion 302 is in engagement with pin 298. When these parts are in engagement, therefore, as shown in Figs. 18, 32 and 33, movement of the arm 296 by the servomotor has no effect upon the position of the bell crank 286. The curved portion 302 of the bell crank arm 300 is connected with a straight portion 304 which extends a distance approximately corresponding to the inner half of the bell crank arm 300, the portion 304 being so angularly disposed that when the pin 298 is moved by the servomotor from the position in which the pin is shown in Fig. 34 to the position in which it is shown in Fig. 18, the bell crank is rocked counterclockwise, as viewed in these figures, far enough to force the plunger 51 from between the rollers 53 and fully to the rear limit of its travel to enable latch plate 72 to lock out the plunger, as previously described, due to the inward movement of the bar 285. It will be observed that movement of the camming pin 298 in the opposite direction, from the position shown in Fig. 18 to the position shown in Fig. 34, is not effective to project the plunger into its wedging position between the rollers 53, and the pin may then simply disengage itself from the bell crank, so that the parts then assume the positions in which they are shown in Fig. 35.

A sector gear 117 is fast on yoke shaft 115 and actuatable by the servomotor 213 to shift clutch collar 34. Sector gear 117 meshes with sector gear 122 which turns in unison and co-pivotally with lever 118. Sector gears 117, 122 are provided with involute or other conventional meshing gear teeth as 305 extending throughout only a part of their peripheral length. For the remainder of its peripheral length, sector gear 122 is provided with an elongated mutilated tooth of half height having a convex arcuate upper surface concentric with the axis of rotation of the sector, such mutilated tooth portion being designated 306, while the corresponding surface of the upper sector gear 117 is provided with a coacting mutilated tooth portion 308, also of half height, which is a concave arc of the same radius as the arc of tooth 306 and which is also concentric with the axis of rotation of sector 122 about pin 119 when the parts 306, 308 are in engagement. By virtue of this arrangement, when the sector 122 is rocked counterclockwise, as viewed in Fig. 18, from the position indicated in that view to a position such that the involute teeth pass out of mesh with one another, the surfaces 306, 308 are brought into engagement, and after the sector 117 has thus been moved to the limit of its intended travel by the conventional intermeshing teeth 300, 305, the surface 306 may slide with respect to the surface 308 to allow the sector 122 to continue counterclockwise throughout a greater angular movement. Such additional angular movement is provided to permit the pin 298 to move out of the way of the bell crank 286, but it will be noted that during such overtravel or independent travel of the sector 122, the sector 117 is locked against rotation by the interengagement of the surfaces 306 and 308, which function similarly to a Geneva escapement. Detent means is preferably provided to prevent any tendency of the sector 117 to rock and bind during independent rotation of the sector 122. Such detent means may comprise a conventional spherical-ended detent plunger 310 wieldably projectable by means of a compression-type backing spring 312 into either of a pair of shallow depressions as 314 formed in a peripheral edge of the sector 117 concentric with its axis of rotation.

The action of the servo-mechanism 213 is controlled by a solenoid valve 218, the arrangement being such that when the solenoid valve is energized the servomotor moves the shifter fork 113 to a position to shift the clutch collar 34 to the dashed line position shown in Fig. 5 in which either direct drive or overdrive is operable, while when the solenoid valve is de-energized the spring 222 acts through the movable power element 212 of the servomotor to shift the clutch collar 34 back to the direct drive position. The switch 262 is, of course, also closed when the vehicle is in operation and this switch may also serve as an ignition switch if desired, or may be ganged with the ignition switch for concurrent operation.

The underdrive or primary transmission ratio drive means generally designated 7 and the principal components of which are illustrated in Figs. 21 and 22 may, as there indicated, be of a conventional selective sliding type affording two underdrive speeds, direct drive and reverse, and the details of this transmission will require no description to those skilled in the art. The shifting of the underdrive transmission may be controlled by a conventionally mounted hand-shifting lever 316 supported upon the steering column 318 in a position convenient to the driver in the usual manner. The shift lever serves to impart rocking and longitudinal movement to a shifter shaft 320, also in the usual manner, and the movements of this shaft may serve to selectively rock the first and reverse gear-shifting arm 322 and the second and high speed shifting arm 324 at the will of the operator in the usual manner.

A switch generally designated 325 is provided, mounted upon the steering column below the floor board 326 and is constructed and arranged in such manner that it is normally open when the second-high gear shifting arm 324 is in neutral position, but is closed when this shifting arm is in either second gear or high gear position.

The Taylor patent above referred to discloses manually operable means controllable through a Bowden cable from the instrument panel for shifting the clutch collar 34, and the clutch collar only occupies the direct drive position (right-hand position as viewed in Fig. 5) when manually shifted thereto by the driver, who must accordingly make a conscious effort and effect this shaft when he desires the benefit of direct drive with engine braking or wishes to prevent the unit from shifting up to the overdrive ratio. The construction herein disclosed incorporates means whereby a downshift from overdrive to direct drive or third speed may be effectuated merely by depressing the clutch pedal at any time, and whereby such downshift is accompanied by an automatic shifting of the clutch collar 34 from the overdrive position to the locked-up (right-hand) position to afford a positive two-way direct drive through the overdrive unit, so that engine braking immediately becomes effective in response to such a clutch pedal-effected shift, without the need of actuating any special control to achieve such operation.

I also incorporate means whereby the clutch collar 34 is shifted back to the positive two-way direct drive position whenever the gears of the underdrive transmission are moved from second or third gear position to neutral, or to first gear or reverse positions.

Switch 325 previously mentioned forms a part of the control means in question for the clutch collar 34. The details of construction of the switch 325 are clearly shown in Fig. 27, while the manner of mounting thereof is indicated in Figs. 1, 23, 24, 25 and 26. The switch body (to which the numeral 325 is applied as a general designation) is of hexagonal section externally, and provided with a cylindrical internal chamber 326, the body being supported by means of an integral, externally threaded and axially drilled neck portion 328, threaded into a bracket 340 supported upon the steering column 318 by conventional strap-type clamping portions 342, 344, the former integral with the bracket portion 340, the clamping portions being secured together and upon the steering column as by means of the screws 345. The portion 342 may also comprise the supporting bearing for the shifter shaft 320. The lower end of the switch body is formed as a block 346 of insulating material and carries a pair of spaced contacts having head portions as 348 disposed within the chamber 326. The conductor 256 is connected to one of the contacts and a conductor connected to the other contact extends to the switch 258. A contact plate 352 within the chamber 326 is capable of bridging and completing an electrical connection between the contact portions 348, but is normally urged away from such contacts by a compression spring 354 within the switch housing. Contact plate 352 is carried by and axially slidable along the stem of an axially disposed rivet 356, the stem of which also carries near its opposite end an insulating washerlike disk 358, both the contact plate 352 and the disk 358 being slidable upon the stem of the rivet but urged outwardly in opposite directions and against the spaced heads of the rivet by a helical compression spring 360 arranged upon the stem of the rivet between the plate and the disk. Insulating disk 358 is larger than contact plate 352, and the spring 354 extends around but is spaced from the contacts 348 and contact plate 352, reacting against the disk 358 in a direction to urge it away from the contacts 348. The effect of the spring 354, therefore, is to tend to carry the rivet 356, and thereby the contact plate 352, axially away from the contacts 348, to open the circuit between the contacts.

A sleeve 362 closed at its outer end is slidable in the bore 364 in the neck portion 328 of the switch casing and spacedly encircles the outer head of the rivet 356, so that when the sleeve 362 is urged inwardly toward the contacts 348, it may bear against the plate 358 independently of the rivet 356 and may urge the contact plate 352 against the contacts 348 through the agency of the interposed spring 360. A ball 365 is slidable in the bore 364 and serves as a thrust member for moving the sleeve 362 inwardly in the manner described. The outer extremity of the neck 328 may be formed inwardly to prevent escape of the ball, although the ball projects from the neck for engagement with an arm 366 rigidly secured to and movable with the second-high gear shifter arm 324.

The proportioning of the parts is such that when the ball 365 and sleeve 362 are free to move outwardly, the spring 354, acting through the disk 358 and rivet 356, moves the contact plate 352 away from the contacts 348, but when the ball and sleeve are pressed inwardly the contact plate is urged into engagement with and completes an electrical connection between the contacts. The arm 366 is formed as a sector of such angular extent that it always overlies the ball 365, and is provided at its extremities with ball-actuating camming pads as 368, 370, between which is a relieved area 372. By virtue of this arrangement, the ball 365 is urged inwardly to close the switch whenever the arm 324 is moved, by means of the shift lever 316, to either the second speed or direct drive position; while when the arm 324 is in the neutral position which it occupies when the underdrive transmission is in either first gear, reverse or neutral, the switch is open and the solenoid valve cannot be energized.

The construction of the other series switch incorporated in the solenoid valve circuit is shown in Figs. 28, 29, 30 and 31, while a preferred manner of mounting the same is indicated in Fig. 1. The numeral 258, serving as a general designation for the switch, which I term a "conditioning" switch, is applied to its sheet metal casing. It will be noted that the casing is secured as by nut and bolt assemblies 375 to a bracket plate 376 attached to the side of the engine 200, as by cap bolts 378. This switch is of the overcenter snap-acting single pole, single throw type, and incorporates a switch arm 380 pivoted in and projecting upwardly from a U-bracket 382 carried by an insulating plate 384 forming one of the side walls of the switch casing, one of the rivets as 385 which serves to attach the U-bracket to the wall 384 also forming the attaching and electrical connecting means for the terminal 386 to which the conductor 260 is connected which leads, as previously indicated, to the switch 262. The arm 380 is carried by a cross pin 388 transfixing the same and carried by the arms of the U-bracket 382. At one extreme of its angular movement, the arm 380 brings up against a stop pad 390 shown as formed integrally with the panel 384; while at the other limit of its travel the arm 380 engages a resiliently supported electrical contact 392 mounted within the casing upon the wall thereof opposite the panel 384, but insulated from such wall as by the insulating supporting washers 394, the contact 392 being carried by a rivet 395 which also carries and serves to conduct current between the contact 392 and the electrical terminal 396 to which the conductor 350 is connected.

The arm 380 is urged with an overcenter snap action toward either extremity of its travel by an overcenter helical tension spring 398, the outer end of which is hooked over a pin 400 carried by the arm 380 near its outer extremity, while the inner end of the spring is attached to a rocking plate 402 supported by an arm 404 formed integrally with the U-bracket 382 and extending inwardly from the wall 384 to a position beneath the pin 388 where it carries a pin 405 by which the plate 402 is rockably supported. The arm 404 may be centrally slotted and the plate 402 supported within the slot, designated 406, plate 402 and spring 398 being housed between the spaced side arms of the switch arm 380, which is formed of two laterally spaced sheet metal sections bent of a single strip of metal in the form of an inverted U, as best shown in Fig. 30. The plate 402 is apertured as at 408 to provide clearance for the portion of the plate which encircles the pin 388, so that such pin does not interfere with rocking movement of the plate.

The switch arm 380 also incorporates laterally extending arm portions as 410, the outer extremities of which rigidly support a cross pin 412 by which the switch arm is actuatable. Actuation of the switch arm is effected by means of a cam plate formed of insulating material and generally designated 414. The cam plate is formed integrally with a hub portion 415 fast upon and rockable with a shaft 416 journaled in and projecting from the front face of the switch casing. The cam plate 414 is provided with a pair of angularly spaced lobes 418, 420 which are engageable with opposite sides of the pin 412 to move the same and resultantly rock the switch arm 380 in opposite directions sufficiently to carry it through its overcenter position and so cause the switch arm to be thrown to one position or the other. The shaft 416 carries upon its end outside the switch casing a bell crank 422, one arm 424 of which is connected by a link 425 to an arm 426 of the star lever 266. The link 425 extends slidably through an eye 428 pivotally carried by the outer end of the arm 426. The end of link 425 remote from the switch carries a head which may be formed by lock nuts as 430, and a helical compression spring 432 is carried by the link between the eye 428 and head nuts 430 so that when the star lever is rotated clockwise, as viewed in Fig. 1, in response to depression of the accelerator pedal, the bell crank 422 is also rocked clockwise, to throw the switch arm to the position in which it is shown in Fig. 28, in which it completes a circuit between conductors 260 and 350 to cause reduced differential pressure energization of the servomotor 213 in accordance with the vacuum effect at the given depressed position of the accelerator pedal 58 as a consequence of partially open throttle above idling engine control. Such partial energization of the servomotor being ineffective to cause the servomotor to operate, but upon release of the accelerator pedal to close the throttle to idle the engine, high vacuum condition will be generated in the engine intake manifold to produce maximum differential pressures across the piston 212 to thus actuate the same to accommodate overdrive operations as will hereinafter be more fully explained. From the foregoing structural description of the conditioning switch 258, the primary purpose of this switch is manifest in providing controlled two-stage energization of the servomotor 213 to effect an upshift responsive to normal manipulation of a conventional accelerator pedal, and at the same time enabling the operator to utilize the selected drive ratio of the manually-operated transmission for vehicular acceleration and/or power as needed by keeping the accelerator in depressed position until such upshift is desired by release of the accelerator pedal momentarily.

The other arm 434 of bell crank 422 has lost-motion connection with the clutch pedal 71, such connection being provided by a link 435 having fast upon its switch end a slotted clevis 436 slidably engaging a pin 438 carried by the end of bell crank arm 434. At its other end the link is pivotally connected to an arm 440 integral and movable with the clutch pedal 71. This arrangement is such that when the clutch pedal is depressed, the link 435 acting through the clevis 436 and arm 434, rocks the bell crank 422 and cam 414 counterclockwise, as these parts are viewed in Figs. 1 and 28, tending to throw the switch to the opposite or open-circuit position. Detent means may be provided to yieldably maintain the bell crank 422 in either position to which it is moved, such detent means being shown as a sector-shaped extension 442 of the bell crank 422 having suitably peripherally spaced, relatively shallow detent notches 444, with which the cooperatively headed extremity 445 of a leaf-type detent spring 446 is engageable.

The parts are so proportioned that depression of the accelerator pedal 58 beyond the position corresponding to the idling or warm-up speed of the engine throws the switch arm 380 to circuit-closing position, but the eye 274 does not engage the head 64 carried by pull wire 59 to pull the plunger 51 from between the rollers 53, until the accelerator pedal is fully depressed. The length of the slot 437 in the clevis 436 is such that when the clutch pedal is depressed, the switch arm 380 may be thrown to open-circuit position, but the switch is not returned to the closed-circuit position with the return of the clutch pedal to the clutch-engaged position. The switch can only be thrown to the closed position when the accelerator pedal is depressed.

*Operation of control system (Figures 1–35)*

With the parts arranged in the manner disclosed, in accelerating the vehicle from a standing start, the operation of the car is conventional in all respects in first, second and third speeds. In first speed, switch 325 is open because shifter arm 324 is in its neutral position. The circuit to the solenoid valve 218 is accordingly open, the servomotor 213 de-energized and the spring 222 maintains the clutch collar 34 in its right-hand position, as viewed in Fig. 5, in which a direct two-way drive is provided through the overdrive unit making engine braking available at all times in first gear. The same is true in reverse, in that only the primary underdrive transmission 7 functions in first gear and in reverse. When the underdrive transmission is shifted to second gear, switch 325 is closed because pad 368 engages the ball 365 as the sector arm 366 swings to its second speed position with shifter arm 324. When the accelerator pedal is depressed sufficiently in second gear, contact arm 380 of the conditioning switch is thrown to closed-circuit position through the action of the star lever and link 425, as previously indicated, and the servomotor is resultantly partially energized to the extent effected by the vacuum produced in the engine intake manifold at the given depressed position of the accelerator 58, but movement of the clutch collar 34 to the overdrive position in which it is shown in dashed lines in Fig. 5, cannot be effected by the servomotor 213 until subsequent release of the accelerator pedal to close the throttle to idle the engine, so that sufficient vacuum will be generated in the engine intake manifold to operate the servomotor substantially maximum energized condition. Plunger 51 cannot enter the space between the rollers 53 so long as the driving torque is maintained, however, so that the car would continue in direct or underdrive second gear even if the collar 34 shifted, the overrunning clutch 105 then maintaining direct drive through the overdrive unit, until the torque is relieved or reversed in response to release of the accelerator pedal. If the accelerator pedal 58 is released in second gear, the overdrive unit will shift to the overdrive ratio to provide an overdrive second gear ratio, the action being as previously described. If the clutch pedal is depressed in the act of shifting from second to high gear, the switch arm 380 is moved to open-circuit position, re-establishing two-way drive through the overdrive unit. When the accelerator pedal is again depressed, switch arm 380 is moved to close the circuit to the solenoid valve, the servomotor 213 is energized if or when the pressure is low enough in the intake manifold, and the clutch collar 34 is shifted to the overdrive position. The car would continue in direct drive until the accelerator pedal is subsequently released or the torque is otherwise reversed, whereupon the overdrive unit automatically shifts to the overdrive ratio as previously described.

If, in either the overdrive second or the overdrive third ratio, the accelerator pedal 58 is fully depressed, the plunger 51 is pulled from between the rollers 53 and direct drive is reestablished through the overdrive unit to reduce the drive to underdrive second or to third speed, as the case may be.

At any time that a reduced speed drive with engine braking is desired, in either second or high gear, with the car proceeding in overdrive, it is merely necessary to depress the clutch pedal 71, which will immediately move the switch arm 380 to open-circuit position, as previously described, and the resultant de-energization of the servomotor 213 will cause the arm 296 to move clockwise, as viewed in Fig. 1, so that its pin 298 will first, acting through the bell crank 286, force the plunger 51 from between the rollers 53 to re-establish free wheeling direct drive, and then shift the clutch collar 34 to establish reversible direct drive. In response to subsequent depression of the accelerator pedal, the reclosing of the switch arm 380 reconditions the overdrive unit by again connecting the servomotor 213 to the intake manifold so that clutch collar 34 may move back to the overdrive position in dashed lines of Fig. 5, so that a subsequent shift to overdrive can be effected by the driver at will merely by momentarily releasing the accelerator pedal.

*Modified control system mechanism (Figure 1A)*

In the embodiment depicted in Figure 1A, wherein parts analogous to those already described are designated by like reference characters distinguished by the addition of the letter "A" to each, only the components of the control system are shown, and it may be assumed that the power transmission devices correspond to those of the embodiment first disclosed.

The system of Fig. 1A is designed to control a supplemental transmission, which is not shown in this view but which may also be of the overdrive type and of the same construction as the unit already described, incorporating corresponding "kick-down" shifting means operable through the agency of a pull cable 59A connected to the wedging roller housing 44A and similarly actuatable in response to full depression of the accelerator pedal 58A. Also in analogous manner a servomotor may be provided to control shifting of a clutch collar corresponding to the collar 34, the action of the servomotor being under the direction of a solenoid valve 218A.

The solenoid valve is connected to the source of current represented by the battery 264A through a switch 325A, the construction, arrangement, and operation of which may correspond to those of the switch 325 previously described. Connection from the battery to the switch is made through conductors 260A, 261A and an interposed manual switch 262A while connection from the switch to the solenoid valve is through the agency of a conductor 256A.

The hand-shift lever 316A is connected to and adapted to operate the shiftable elements of a conventional transmission in the usual manner, as in the previous embodiment and the shift lever is also arranged to operate a switch actuating arm 366A in such manner as to close the switch 325A only when the shift lever is moved to the positions required to place the transmission in second and high gears. The connection between the accelerator pedal 58A and the pull wire 59A may include a star lever 266A generally similar to that of the first embodiment, although since the conditioning switch 258 of the first embodiment is omitted, the corresponding arm of the star lever may also be omitted.

*Operation of modified control system (Figure 1A)*

In this embodiment, the overdrive unit functions as in the first described embodiment, except that by virtue of the modified control arrangement the shifting collar 34 is positively held in the locked-up direct drive position by the return spring of the servomotor except when the shift lever 316A is in second or high speed position (and the accelerator pedal has been released to cause the shift to overdrive). It will also be apparent that if it is desired to return the shifting collar to the locked-up direct drive position at any time, this may be done while the car is proceeding forwardly in overdrive, merely by momentarily moving the shift lever to the neutral position and then back to the driving position. There is no clutch pedal operated switching mechanism in this embodiment. Accordingly, if the accelerator pedal 58A is depressed in the normal manner as the clutch is re-engaged, after such a downshift effected by means of the shift lever, the manifold pressure may be kept high enough to prevent the servo motor from moving the shift collar back to the overdrive position and the vehicle may accordingly proceed in the locked-up direct drive for any desired length of time while the accelerator pedal is depressed only partially. In order to shift to overdrive however, it will merely be necessary to momentarily release the accelerator pedal to cause the pressure in the intake manifold to drop sufficiently to operate the servomotor to shift the clutch collar 34, as will be apparent.

*Modified control system mechanism (Figures 1B–6B)*

In the embodiment shown in Figs. 1B to 6B inclusive, the arrangement is essentially similar to that of the embodiment last described, except that the gear shifting and switch actuating parts are so arranged as to provide the hand shift lever 316B with special supplemental positions for overdrive operation. With this construction, after shifting the primary transmission to either second gear or high gear, the hand-shift lever may be moved at will to a distinct supplemental position to condition the overdrive shifting mechanism and enable a subsequent shift to overdrive upon release of the accelerator pedal in a manner analogous to the operation of the previous embodiment. In this embodiment also corresponding parts are designated by like reference characters to those previously used, distinguished, however, by the addition of the letter "B" to each.

As best shown in Figs. 1B, 3B and 4B, the mechanical connecting means between the hand-shift lever 316B and the shiftable transmission element (not shown) is essentially of conventional character and includes a pair of shift arms 322B, 324B, the former rockable by the hand-shift lever 316B for shifting to and from first and reverse gears and the latter similarly rockable for shifting to and from second and high gears, the lever being movable through a conventional H-pattern to effect such shifting, as indicated in Fig. 2B. Up and down movement of the shift lever and its connected shaft 320B moves a cross pin 502 transfixing and projecting radially from the shaft 320B near the lower extremity thereof, to cause the pin to engage either the radial notch 504 in the hub of arm 322B or the similar opposed radial notch 506 formed in the abutting end of the hub of arm 324B. The conventional character of this arrangement will be recognized by those skilled in the art, and it will be understood that by moving the shift lever in a pattern such as is indicated in Fig. 2B, the transmission gearing may be shifted in the usual manner.

Supplemental notches 508, 510 are formed in the hub portion of arm 322B and so positioned that notch 508 lies opposite notch 506 when arm 324B is shifted to high gear position, while notch 510 lies opposite the end of notch 506 when arm 324B is shifted to second speed position. In each such situation, the notches 508 and 510 form in effect interlocking extensions of the notch 506 in connection with the cross pin 502, accommodating upward movement of the shift lever 316B to a predetermined extent and when so positioned the shift lever is locked against rotation back to neutral position until the lever actuated cross pin is lowered to disengaged position from either the notch 508 or 510 according to the gear ratio established in the main speed transmission. Thus, with the shift lever in second speed position, it may be lifted to the "overdrive second" position shown in full lines in Fig. 2B and designated $O_2$, while after the shift lever has been moved to the regular high speed position, designated 3 in that view, it may be lifted to the overdrive high gear position designated $O_3$ in the same view. The conventional transmission interlock mechanism (not shown) with which change speed gear transmissions are customarily supplied, may be relied upon to prevent any simultaneous shifting of both of the shift arms 322B, 324B with the shift lever in the raised or overdrive conditioning position.

The overdrive control switch, the casing of which is generally designated 325B, is closable only by lifting of the shift lever to either of $O_2$ or $O_3$ position. Although the operative components of the switch are essentially similar to those of the construction shown in Fig. 27, and will require no detailed redescription, the switch closing stem 362B is materially elongated and extends downwardly rather than upwardly with respect to the steering column. The switch body is similarly mounted upon a bracket arm 340B, although in inverted position, as stated, and in place of the switch actuating pad 366 of the first embodiment, a sector-shaped pad 366B is secured to the lower extremity of a coaxial extension 601 of the shaft 320B, which extension projects below the shaft supporting bearing bracket 342B. The stem 362B carries a rigid or integral 365B spaced upwardly from its lower end and peripherally spaced lugs 368B, 370B are carried by the pad 366B in such position that when the shaft 320B is rocked to either extreme of its angular movement between the second and high position, the lugs 368B, 370B are carried into underengaging relation with respect to the collar 365B as the end of such movement is reached, whereafter, by lifting upon the hand lever as previously described to move it to either the $O_2$ or $O_3$ position, the collar 365B may be moved upwardly to raise the stem and close the contact bar 352B and complete a circuit to the solenoid valve. The portion 366B of the switch actuating pad between the lugs 368B, 370B is cut away, as indicated at 372B, sufficiently to clear the collar 365B, and since both of the lugs 368B, 370B are away from the collar when the shift lever is at or near the neutral position, it will be apparent that the shift lever may be raised to the upper leg of its H-pattern in the normal manner, through the neutral position, without causing either of the lugs to contact the collar 365B.

*Operation of modified control system (Figures 1B–6B)*

In the operation of this embodiment gear shifting is effected in the usual manner, and if the overdrive is not used, the control of the car is conventional in all respects. In order to use the over drive gear, which is possible only in second speed and in direct drive, it is merely necessary to lift the shift lever upwardly and toward the steering wheel through a slight additional travel, which conditions the overdrive system by closing the control switch 325B to complete a circuit to the solenoid valve (not shown in this embodiment) which may correspond to the solenoid valve 218 first described. The car will proceed in second or high gear as the case may be so long as the driver continues to depress the accelerator pedal, but the upshift to overdrive occurs upon momentary release of the accelerator pedal while the momentary "kickdown" shift to either second gear or direct drive may be obtained at will for power and/or acceleration by merely fully depressing the accelerator to the floorboard without disturbing the lifted position of the shift lever, as in the previously described embodiments.

Also the downshift from overdrive to direct drive or second gear is made effective by merely pushing the hand lever downwardly, or fully depress the accelerator pedal while the hand lever remains lifted, which immediately breaks the circuit to the solenoid valve, allowing the servomotor piston to return under the influence of the servomotor spring, which shifts the collar to the locked-up direct drive position, re-establishing a two-way direct drive through the overdrive unit.

*Modified control system mechanism associated with an overdrive change-speed transmission (Figures 1C–10C)*

In the modification shown in Figs. 1C to 10C inclusive, the principles of the present invention are shown applied to an automatic gear transmission mechanism which incorporates only two forward speeds, the torque varying characteristics of which are supplemented by a hydrodynamic torque converter of the Foettinger type, generally designated 600. In this embodiment also, corresponding parts are designated by like reference characters to those previously used, distinguished, however, by the addition of the letter "C" to each. As shown in Fig. 1C, the hydraulic torque converter may be interposed between engine 200C and the gear transmission contained in case 2C. The principles of construction and operation of such hydraulic torque converters are well understood and will require no detailed disclosure here. It will also be understood that no friction clutch will be required with this construction.

The torque output of the hydraulic torque converter is transmitted through a simple reversing gear assembly contained in a reversing gear housing 607 secured to the rear end of the hydraulic torque converter housing and in turn supporting the extension housing 2C of the automatically shiftable gear transmission, the construction and operation of which may be similar to the overdrive unit disclosed in connection with the first described embodiment, although it will be appreciated that the gear ratios thereof may be changed by simple re-arrangement thereof in engineering respects if desired.

As shown in Fig. 3C, the reversing gear includes a driving gear 608 having an integral crown clutch portion 610 for direct drive engageable by a coacting crown clutch portion 612 formed integrally with the slidable gear clutch unit 612, 614 feathered to the main shaft upon splines 615 and movable by means of a conventionally arranged shifter fork 616 operable by a shifting arm 618 mounted outside the casing 607 and fast upon the yoke supporting shaft 620. The arm and yoke are rockable to shift the gear clutch unit in such manner as to enable moving the same to any one of three positions; viz., the high speed or direct drive position shown in full lines in Fig. 3C, a reverse drive position in which the gear portion 614 meshes with a reverse idler gear 622, or an intermediate neutral position in which the last two mentioned gear portions are out of mesh and the crown clutch portions 610, 612 are also disengaged. The drive is conducted from the driving gear 608 to the reverse idler 622 in conventional manner by a lay shaft gear cluster consisting of gear portions 624, 626 meshing respectively with the gears 608, 622 and integral with the cluster sleeve 625 journaled by appropriate means (not shown) in the casing 607.

Shifting of the gear clutch unit 612, 614 may be manually effected by means of a hand-shift lever 316C mounted in conventional manner upon the steering column 318C but which is movable to only three positions, which may lie in a straight line, as shown in Fig. 2C, viz., a forward and raised reverse position designated R in that view, a neutral position designated N and a lowered and rearward "drive" position designated D. Shift lever 316C is fast with respect to a simple rockshaft 320C rotatably supported beside the steering column and having fast upon its lower end beneath the floorboard 326C a shifting arm 322C connected by a link 628 to shifting arm 618. As shown in Figs. 3C and 4C, poppet means may be provided to define the positions of the gear clutch unit, consisting of a spring-pressed ball 630 engageable with respect to three appropriately positioned shallow depressions 632 formed in a plate 635 mounted within the gear case cover 634. Cover 634 serves to support the shifter yoke 616 and its actuating mechanism in the manner shown, which will be recognized as a common expedient in present day transmission constructions.

In this embodiment also the gear transmission unit contained in the casing 2C is shiftable through the agency of a servomotor 213C controllable by a solenoid valve 218C, while a kick-down shift in response to full depression of the accelerator pedal 58C may also be effected in analogous fashion through the agency of a Bowden cable 59C actuatable by and in response to full depression of the accelerator pedal through appropriate linkage not necessary to be redescribed and including a star lever 266C also analogous to the corresponding part of the first described embodiment.

In Fig. 1C the servomotor piston rod 215C is shown in the extended or left-hand position in which it maintains the gear transmission unit in the lower speed ratio in a manner analogous to operation of the equivalent parts of the embodiment first described, while it will be understood that when the solenoid valve 218C is energized and sufficient reduction of pressure exists in the manifold 220C, the servomotor rocks the arm 118C counterclockwise as viewed in this figure to so move the shifting collar or equivalent part of the gear unit as to enable the establishment of the higher gear ratio.

The solenoid valve 218C is adapted to be energized from the battery 264C whenever the conditioning switch, the casing of which is generally designated 258C, is closed. A link 435C is pivotally connected to shifting arm 618 and extends to the interrupter switch actuating arm 434C to which it is connected by a yokelike clevis 436C having a slot 437C therein so proportioned that movement of the switch actuating arm to switch closing position is blocked except when the shifting arm 618 is in the drive position wherein clutch portions 610, 612 are interengaged. Return of arm 618 to the neutral or reverse position by the shift lever 316C moves the switch actuating arm in such manner as to open the switch and break the circuit to the solenoid valve. The general construction and arrangement of the components of the interrupter switch will be recognized as similar to those of the first described embodiment, and will require no detailed redescription. They are clearly shown in Figs. 5C and 6C, and it will be observed that parts analogous to those already described are designated by like reference characters distinguished from the addition of the letter "C" to each.

It will be observed that in this embodiment the conditioning switch is not actuatable by the accelerator pedal, but that the actuating bell crank arm generally designated at 422C for the conditioning switch also incorporates an arm 424C carrying at its outer end a pad 640 engageable by the rounded upper extremity 642 of the slidable plunger-type armature 644 of a solenoid 645. When energized, the solenoid is adapted to lift the armature and so shift the conditioning switch to the closed-circuit position unless such movement of the switch is blocked by the yoke 436C in the manner previously described because the reversing gear unit is either in neutral or reverse.

The conditioning switch actuating solenoid, the casing of which is generally designated 646, is connected to the power lead 260C from the battery 264C through a governor controlled switch contained in a casing 648 and a disabling or interrupter switch contained in a casing designated 650, the last-mentioned switch being supplemental to and actuatable by the solenoid and connected to the power lead 260C by a conductor 652 and to the governor switch by a conductor 654. The governor switch is in turn connected to the solenoid by a conductor 656, while the solenoid is grounded as indicated at 658. It will be evident from the foregoing that the solenoid is only energizable when both of the switches contained in casings 648, 650 are closed.

The governor switch is actuatable by a speed-responsive governor construction, the details of which are of course subject to wide variation but which may as indicated be essentially conventional in character, comprising as shown a pair of flyweights 660 swingable outwardly about their supporting pivot pins 662 under the effect of centrifugal force when rotated about an axis perpendicular to the plane of the pins through the agency of a flexible shaft assembly generally designated 664. The casing 648 houses both the governor and the governor-operated switch mechanism and is shown secured to the side of the engine crank-case as by screws 665. The flexible governor driving shaft is driven from the propeller shaft 12C, so that the action of the governor may be responsive to the speed of an element driven at vehicular speed, the driving means for the flexible shaft being shown as comprising a worm 666 splined to the propeller shaft, and a worm wheel 668 drivable thereby and fast upon the driving end of the flexible shaft. Outward movement of the flyweights 660 in response to centrifugal force lifts a caplike thrust sleeve 670 by camming action of the flyweights, which are provided with notches 672 overengaging a flange 673 projecting from the thrust member 670 at its lower end. The upper extremity of the thrust member is engageable with a pad 674 mounted upon the underside of the horizontally disposed governor switch arm 675.

The switch arm 675 is supported by the insulating top cover portion 676 of the casing 648, the cover being secured to the casing by screws 678 and the switch arm directly overlying the axis of the governor assembly and the top of the switch actuating thrust member 670, as indicated in Figs. 8C and 9C. The switch arm is urged downwardly, toward open position, by a helical compression spring 680 trapped in a pocket 681 in the undersurface of the insulating and supporting cover plate 676 and bearing downwardly against the top of the switch arm. The switch arm is pivoted at one end as at 682 to a combined supporting and terminal post 684 to which the conductor 654 previously mentioned is connected. The outer extremity of the switch arm carries a contact point 685 normally separated from a fixed contact 686 carried by the other terminal post 688 to which conductor 656 is connected, the contacts being closable, however, as will be apparent, when the thrust member 670 is raised sufficiently under the influence of centrifugal force developed by the flyweights. The developed centrifugal force is of course a function of the speed of the vehicle, assuming that a conventional constant ratio final drive is employed.

The switch construction contained in the casing 650 is analogous in many respects in general construction to the switch 325 previously described, although it will be observed that this switch, the construction of which is best shown in Fig. 7C, is of the normally closed type. The switch contacts 690, 692 are fixedly carried within the casing 650 by the insulating outer cover plate 694, the conductors 652, 654 being connected to the contacts 690, 692, respectively, by suitable terminal means such as that indicated at 695. A circuit is normally completed between the contacts 690, 692 by a contact bar 696 transversely supported in the casing 650 for axial movement therein by means of a stem 698 slidably axially supported in the casing by a transverse insulating supporting and spring abutment plate 700 which is in turn carried by a stem portion 702 slidably mounted in the nipplelike supported inner end of the casing portion 650, stem portion 702 bearing against the plate 700 within the casing while an actuating ball 704 bears against the outer end of the stem and is actuatable by suitably contoured camming portions formed upon the plunger 644. A helical compression spring 705 housed in the casing 650 and reacting at one extremity against the cover portion 694 and at the other end against the plate 700 urges the plate in a direction to yieldably force the contact bar 696 toward the closed-circuit position.

When the solenoid 645 is de-energized, and the plunger 644 is in the lowered position, the switch actuating ball 704 is projected by the spring 705 into a reduced portion 706 of the plunger, which allows the switch to close. When the plunger is lifted in response to energization of the solenoid, the ball is forced outwardly, to open the switch, by a partly conic camming portion 708 which connects the reduced portion 706 with the remainder of the solenoid plunger. Directly below the camming portion 708, the plunger is also formed with a shallow peripheral groove of rounded contour designated 710. The positioning of this groove and the momentum of the plunger when actuated upwardly by the solenoid are such that as the plunger completes its upward movement, although the solenoid is instantly de-energized as the ball 704 travels outwardly over the cam portion 708, the plunger is carried upwardly by its inertia sufficiently to move the channel 710 into registry with the ball 704. The ball 704 then acts as a detent to maintain the plunger in the raised position despite the fact that the solenoid is de-energized by the opening of the ball actuated switch. During such upward movement of the plunger, the rounded nose thereof rocks the bell crank 422C in a direction to actuate the conditioning switch arm 380C to closed-circuit position.

*Operation of modified control system (Figures 1C–10C)*

It will be apparent from the foregoing that with the vehicle proceeding forwardly in the normal manner with the shift lever 316C in the drive position, when the speed of the vehicle becomes sufficient, the governor switch arm 675 closes, the ball actuated switch being also closed, a circuit is thereby completed to the solenoid winding 645. The solenoid thereupon closes the interrupter switch in the manner described, completing a circuit to the solenoid valve 218C. Thereafter, and upon momentary release of the accelerator pedal, the shift to the higher speed occurs as in the first described embodiment, although it will be appreciated that the lower gear may be maintained for as long a time as may be desired merely by maintaining pressure upon the accelerator pedal, so that the higher torque drive may be employed by the driver at will or when necessary. It will further be apparent that when proceeding in the higher gear ratio if the higher torque of a lower gear ratio is desired it is merely necessary to push the accelerator pedal all the way to the floorboard to effect a kick-down shift through the agency of the wedge actuating cable 59C, also in the manner previously described.

*Modified control system mechanism associated with a change-speed transmission (Figures 1D–8D)*

A further modification of the invention is represented in Figs. 1D to 8D inclusive in which corresponding parts are designated by like reference characters to those previously used, distinguished, however, by the addition of the letter "D" to each, which shows an improved transmission control system for use with a simple two-speed and reverse gear box contained in a casing generally designated 2D and in conjunction with which a hydraulic torque converter of the Foettinger type is also preferably employed, the hydraulic torque converter being contained in a casing 600D which serves as a support for the gear transmission 2D as in the embodiment last described. The constructional features and the details of the hydraulic torque converter form no part of my present invention and need not be considered herein.

While the details of the construction of the mechanical transmission are also subject to wide variation, the essential features of a suitable mechanism are shown in Fig. 2D. As there indicated, the engine torque transmitted through the hydraulic torque converter is delivered to a main driving gear 608D in constant mesh with countershaft gear 624D which through the rigidly connected countershaft gear 626D drives the reduced speed gear 750. The forward end of the transmission shaft 615D is smooth and carries loose thereon a sleeve 751 on which the gear 750 is freely rotatable. Sleeve 751 projects rearwardly through and beyond the gear and the projecting part is formed with clutch teeth 754. The forward extremity of the sleeve 751 is splined and interengaged with the correspondingly internally splined clutch collar 760 slidable thereon. On its front face, gear 750 carries clutch teeth 753 to and from clutched relation with which clutch collar 760 is movable to render gear 750 fast or loose with respect to the sleeve. The rear portion of the transmission main shaft 615D behind sleeve 751 is splined and carries a slidable gear clutch unit comprising a reverse gear 614D rigidly carrying upon one side thereof a toothed clutch portion 752 slidable to and from interlocked engagement with the clutch teeth 754 on sleeve 751. The gear clutch unit is slidable by means of a conventional shifter fork 616D by which it may be moved from the forward driving position shown in full lines in Fig. 2D to neutral and reverse positions, the neutral position being an intermediate one wherein clutch portion 752 is out of engagement with clutch portion 754 while gear 614D is also out of mesh with the reverse idler 622D, and the reverse position being the extreme rearward one wherein gear 614D is meshed with the idler gear. The reverse idler is in constant mesh with a countershaft reverse gear 626D, the arrangement of these parts being conventional, as will be recognized.

For direct drive, which constitutes the higher speed drive of this gear transmission unit, gear 608D may be keyed to the sleeve 751 through the agency of the slidable clutch unit 760 which when moved forwardly by its shifter fork 762 interlockingly engages a toothed clutch portion 764 rigidly carried by the rear face of gear 608D. Such forward movement of clutch collar 760 frees gear 750 prior to engagement of the direct drive clutching means, and it will be seen that the direct drive is completed to shaft 615D through the clutch teeth 754, 752 and gear clutch unit 614D.

The entire shifter mechanism for the shiftable units may be supported upon the cover plate 634D, as shown. Shifter fork 616D for the gear clutch unit is movable by means of an arm 618D mounted outside the casing to enable selection of forward, neutral and/or reverse, and this selection may be normally effected. Shifter fork 762 for the low-high speed clutch collar 760 is actuatable by means of an arm 770 carried by the outer extremity of a shaft 772 journaled in the cover 634D, and power means is preferably provided for shifting clutch 760. Shaft 772 supports the shifter yoke 762 upon an arm 774 lying inside and close to the cover 634C and having a depending sector-shaped extension 775 with an arcuate and appropriately notched lower edge adapted to coact with a spring-pressed poppet 776 which defines the two positions, corresponding to direct and reduced speed drives, to which the clutch 760 is movable by appropriate rocking movement of the arm 770. As best shown in Figs. 3D, 4D and 8D, the arm 770 is not directly keyed to the shaft 772, but is capable of limited independent rocking movement with respect thereto by virtue of the fact that it is rotatable thereon, but provided with a pin 778 fast in its outer face and spaced somewhat above the opening 780 in such arm which is journaled upon the shaft 772. Pin 778 extends into an arcuate slot 782 formed in a keying plate 784 fast upon the outer end of shaft 772. Slot 782 is concentric with the axis of the shaft 772. Arm 770 is also extended upwardly above the pin 778, and provided with a cam surface concentric with the shaft formed by an integrally inturned flange portion 785 in which a pair of depressions 786 and 788 are formed, peripherally spaced from one another a distance corresponding to the angular displacement of the lever arm 770 required to shift clutch 760 between its extreme positions.

An ignition interrupter switch, the casing of which is generally designated 790, is carried by the cover 634D and arranged to be actuated by the camming flange portion 785 of the arm 770. The ignition interrupter switch is of the normally open type, but so connected to the ignition system of the engine of the vehicle that when closed it disables the ignition system by grounding the same. Such grounding is intended to occur only momentarily, to interrupt the torque upon the clutching portions and so facilitate shifting of the clutch element 760. The switch body 790 is supported upon an integral bracket lug 792 extending from the cover 634D above the camming flange 785. An actuating ball 794 for the movable switch contact element 795 is so positioned that when it projects into one of the depressions 786, 788, the switch is open, while when the arm 770 is rocked to force the intermediate higher portion 796 of the flange 785 (which intermediate portion serves as a cam lobe) under the ball 794, the ball is thereby raised to close the switch and ground the ignition system. By virtue of the lost-motion connection between the arm 770 and the yoke actuating shaft 772 provided by the pin 778 and slot 782, initial movement of the arm 770 rocks the cam flange 785 sufficiently to lift the ball 794 and ground the ignition before effort is applied to the yoke 762 to move the clutch element 760. Accordingly, the ignition is interrupted upon initial movement of arm 770, torque is thereby released from the clutching portions, and clutch element 760 may be moved easily to its other position. It will be observed that as the clutch completes its movement, the arm 770 travels to its other position in which the ball 794 may drop into the other of the two channels 786, 788, restoring the ignition so that the car may continue in the changed speed ratio.

Power for shifting clutch element 760 is derived from a servomotor 213D connected to the arm 770 by means of a clevis 216D which serves to connect the servomotor piston rod 215D to the arm 770. Connection between the servomotor cylinder 214D and the intake manifold 220D is under the control of a solenoid valve 218D, the construction and arrangement of these parts corresponding to those of the equivalent portions of the embodiments of Fig. 1 and Fig. 1D.

The forward-reverse gear clutch unit 614D, 752 is manually shiftable by the hand-shift lever 316D mounted adjacent the steering column 318D, the shifting arm 618D on the transmission casing cover being connected to the shifter arm 322D on the lower end of the steering column by a link 628D, the arrangement of these parts also corresponding to those of the last described embodiment. Again it will be observed that the hand-shift lever need have only three positions corresponding to those of Fig. 2C; viz., a central neutral position, a reverse position, shown as one wherein the lever is moved forwardly and upwardly, and a driving position, shown as one wherein the lever is moved downwardly and rearwardly.

In this embodiment a conditioning switch 258D is also provided, the construction, arrangement and operation of which correspond to those of the embodiments previously, the switch being adapted to be thrown to the closed-circuit position, to complete a circuit to the solenoid valve 218D, in response to partial depression of the accelerator pedal, unless movement of the switch arm is blocked by the clevis yoke 436D, which is moved to and held in the blocking position whenever the hand-shift lever 316D is moved away from the driving position. The yoke 436D is carried by the link 435D, the other end of which is connected to the shifting arm 618D for the reduced speed and reverse shiftable gear clutch assembly 614D, 752. One terminal of the conditioning switch is connected to the battery 264D through the ignition switch 262D and by way of a conductor 260D. The other terminal of the conditioning switch is connected by a wire 350D to a normally closed kick-down switch, the casing of which is generally designated 800, the other terminal of the kick-down switch being connected to the solenoid of the solenoid valve 218D by a conductor 256D.

As best shown in Fig. 5D, the kick-down switch includes a contact bar 802 normally urged against and completing a circuit between contacts 804, 805 carried in axially parallel relation by an insulating end wall 806 of the switch. The contact bar is urged to the circuit-closing position by a coil compression spring 808 bearing axially outwardly against an insulating abutment disk 810 which supports the contact plate 802 through the agency of the slidable axially disposed rod which may be formed of a rivet 812 having spaced heads and upon which the contact bar 802 is slidable, the contact bar and its supporting rivet being urged outwardly by a relatively fine coil compression spring 814 trapped on the rivet between the contact bar and the disk 810. The switch actuating stem 815 extends slidably through the nipplelike axial casing portion 816 formed integrally with and serving to support the remainder of the switch casing 800 and held to a supporting bracket portion 818 by a nut 820 threaded upon an externally threaded portion of the supporting nipple 816 of the casing.

The bracket portion 818 may comprise an integral flange extending laterally from the body of the bracket 270D which carries the star lever 266D which, as in the previously described embodiment, serves as the connecting means between the accelerator pedal 58D and the several controlled components to which the accelerator pedal is connected. One arm 272D of the star lever rotatably supports a terminal eye 274D slidable upon the stem portion 815 of the kickdown switch, an abutment in the form of a pair of lock nuts 64D being carried at the outer extremity of the switch actuating stem 815 in such position that the interrupter switch is opened by and concurrently with full depression of the accelerator pedal or, if preferred, by movement of the accelerator pedal slightly beyond the full open throttle position.

Another arm 426D of the star lever is in analogous fashion connected by a pull rod 425D to an arm 424D of the interrupter switch actuating bell crank 422D, the other arm 434D of the bell crank carrying at its extremity the pin 438D coacting with the yoke 436D and rod 435D and connected parts in such manner that movement of the conditioning switch arm 380D to closed-circuit position is blocked except when the hand-shift lever is in the drive position, as previously indicated. The length of the slot 437D in the yoke is such, however, that the switch cannot be thrown to closed-circuit position by the hand-shift lever which, when it is moved to the drive position merely pulls the yoke downwardly and rearwardly (as viewed in Figs. 1D and 6D), far enough to enable the bell crank 422D to rock clockwise far enough in response to depression of the accelerator pedal, to throw the switch to the closed-circuit position.

The ignition system of the engine, principal components of which are diagrammatically indicated in Fig. 1D, is also connected to the power lead 260D and may, as shown, comprise an ignition coil or autotransformer generally designated 825, the primary winding 826 of which is connected to the power lead 260D by a conductor 828, the other primary terminal being connected to the interrupter assembly 830 of the engine ignition system by a conductor 832 which is also connected to the condenser 834 and to the ignition interrupting switch 790, to which it is connected by wire 835. It will be seen that when the interrupter switch 790 is closed, during and in response to actuation of the clutch collar shifting arm 770, it short-circuits the make and break contacts of the interrupter assembly 830 of the ignition system, disabling the autotransformer 825 and so momentarily interrupting the ignition.

*Operation of modified control system (Figures 1D–8D)*

Although the operation of the embodiment of Figs. 1D–8D will be apparent from the foregoing, it may be observed that the hydraulic torque converter is fully effective in both of the mechanically selectable speed ranges provided by the gear transmission, while shifting between such mechanical ranges is also effected without effort on the part of the driver by the servomotor 213D, despite which the driver can maintain full control over the shifting of the mechanical transmission at all times. No speed responsive governor is incorporated in this embodiment, so that the driver may proceed in the high range at low speed if desired and without having to operate at high engine speeds, as is necessary with some automatic transmissions. This is highly desirable when driving at low speeds without heavy torque demand, but when the torque demand upon the engine is greater, as during rapid acceleration or in hill climbing, the transmission will not upshift to the higher gear range (direct drive) until the driver releases the pressure upon the accelerator pedal. This is true both during starting or accelerating from low speeds and after a kick-down shift, since even though the conditioning switch 258D may remain closed after a kick-down shift, the servomotor will not shift the collar 760 back to the high speed direct drive position merely in response to a slight release of the accelerator pedal from the fully opened position if there is still a substantial torque demand upon the engine, because under such conditions the pressure in the intake manifold will still remain relatively high. The car will accordingly proceed in the lower gear ratio until the throttle is closed far enough to cause the manifold pressure to fall substantially, which will only occur when the torque demand and throttle opening are small in proportion to the speed of the engine.

While it will be apparent that the preferred embodiments of the invention herein disclosed are well calculated to fulfill the objects above stated, it will be appreciated that the invention is susceptible of modification, variation and change without departing from the proper scope or fair meaning of the subjoined claims.

I claim as my invention:

1. In a control for a transmission mechanism having means to establish two different speed drives, for use with an engine having an accelerator pedal movable from a released position wherein the engine idles to a full-throttle position wherein the engine operates substantially at full speed; a member movable to establish said two speed drives; power-operated means automatically operatable to two positions to move the member; control means to regulate operation of the power-operated means to its two positions, including a member controlling energization of the power means movable by movement of the accelerator pedal from its released position in an engine accelerating direction to a position of relatively small movement as distinguished from approximately full throttle position.

2. In a control for a transmission mechanism having means to establish two different speed drives, for use with an engine having an accelerator pedal movable from a released position wherein the engine idles to a full-throttle position wherein the engine operates substantially at full speed; a member movable to establish said two speed drives; power-operated means automatically operatable to two positions to move the member; control means to regulate operation of the power-operated means to its two positions; the control means including conditioning means connected with the accelerator pedal to be rendered operative upon partial movement of the accelerator pedal from released position in an engine accelerating direction as distinguished from approximately full throttle position, and means to render the power-operated means operable when the conditioning means is so operated and the accelerator pedal is thereafter moved toward released position.

3. In a control for a transmission mechanism having means to establish two different speed drives, for use with an engine having an accelerator pedal movable from a released position wherein the engine idles to a full-throttle position wherein the engine operates substantially at full speed; a member movable to establish said two speed drives; power-operated means automatically operatable to two positions to move the member; the power-operated means being operatable only when the accelerator pedal is substantially in released position, and conditioning means operatable as a prerequisite to operation of the power-operated means, said conditioning means being connected with the accelerator pedal to be put in operating position by movement of the accelerator pedal out of the released position in which the power-operated means is operatable.

4. In a transmission control; an output shaft, an engine having an accelerator device with an accelerator pedal movable from release position to full throttle position to increase speed of the engine, a transmission having means to provide at least two different speed drives between the engine and the output shaft; and power-operatable means to change the transmission from one speed drive to another; means to cause the power-operated means to shift the transmission from a first to a second speed drive, said means including mechanism connected to and rendered operative only by movement of the accelerator pedal from a released position to a first partially moved position; and means to shift the transmission from the second speed-drive setting aforesaid, to another speed-drive setting, said means being connected to and rendered operative by movement of the accelerator pedal to a position further from released position than the previously mentioned partially moved position.

5. In a control for a transmission associated with an engine having an accelerator pedal movable between released and full throttle extreme positions, and with a clutch having an operatable member movable to clutch engaging and clutch disengaging positions; the transmission having means providing low speed operation and operation at two higher speeds; pressure-operated motor means for operating the transmission means between the two higher speeds; electromagnetic valve means respectively energizable and de-energizable to control operation of the motor means to produce said two higher speeds; and means including a source of electrical energy for controlling energization and de-energization of the electromagnetic valve means and for obtaining operations of the motor means to effect said speed changes thereby, said controlling means including a switch closed in response to a predetermined movement of the accelerator pedal from released position to cause the motor means to shift to one of said two higher speeds upon return movement of the accelerator to said released position; and second means operated by movement of the accelerator substantially at its other extreme position to cause the motor means to shift to the other of said higher speeds; manually-operated means to operate the transmission means to produce its low speed operation; and a selector switch operatable to control all of the operations of the motor means.

6. The combination of claim 5 wherein said controlling means also includes means operated by movement of the clutch operatable member to clutch disengaging position to open the said switch.

7. In a control for a transmission associated with an engine having an accelerator pedal movable between released and full throttle extreme positions, and with a clutch having an operatable member movable to clutch engaging and clutch disengaging positions; the transmission having means providing low speed operation and operation at two higher speeds; manually-operated means having a preselective supplemental position; pressure-operated motor means for operating the transmission means between the two higher speeds; electromagnetic valve means respectively energizable and deenergizable to control operation of the motor means to produce said two higher speeds; and means including a source of electrical energy for controlling energization and de-energization of the electromagnetic valve means and for obtaining operations of the motor means to effect said speed changes thereby, said controlling means including a switch closed in response to a predetermined movement of the accelerator pedal from released position to cause the motor means to shift to one of said two higher speed drives upon return of the accelerator pedal to said released position; and second means operated by movement of the accelerator substantially at its other extreme position to cause the motor means to shift to the other of said higher speeds; means for operating the transmission means to produce its low speed operation including the manually-operated means operated to a predetermined position; and a selector switch operatable to control all of the operations of the motor means, in response to operating the manually-operated means to its preselective supplemental position.

8. In control means for a supplemental ratio transmission drive means adapted for installation in an automotive vehicle having an engine controlled by an accelerator-operated throttle; a primary transmission drive-mechanism, and a hand-lever for controlling the forward, neutral and reverse drive action of the primary transmission drive-mechanism; pneumatic-shifting means for the supplemental ratio transmission drive means; a source of fluid pressure different from atmosphere for energizing the pneumatic-shifting means; electro-magnetically operated valve means for causing energized operation of the pneumatic-shifting means to control the supplemental ratio transmission drive means including first and second electrical circuits connectable to a source of electrical energy; a conditioning switch interposed in said first circuit for energizing said electromagnetically operated valve means to operated open position when said conditioning switch is closed; a vehicular speed-responsive switch interposed in said second circuit and including an electromagnetically operated solenoid means having an armature element movable between two extreme positions and operatively connected to only close said conditioning switch when energized; an interrupter switch also interposed in said second circuit in series with said speed-responsive switch and solenoid means and operable in response to movement of said solenoid armature substantially in an extreme position thereof to deenergize the solenoid means notwithstanding the said speed-responsive and conditioning switches are in operated closed position.

9. Means as defined in claim 8 including interconnecting means between said hand-lever and conditioning switch and operable in response to movement of said hand-lever to control neutral action of the primary transmission drive-mechanism, to open said conditioning switch contacts.

10. Means as defined in claim 9 wherein the said interconnecting means comprises a link having a slot and pin lost-motion connection with the actuatable conditioning switch element to accommodate closure of the conditioning switch contacts by the solenoid means when energized with the hand-lever controlling the forward drive action of the said primary transmission drive-mechanism.

11. Means as defined in claim 10 wherein said interconnecting means also incorporates one-way spring connecting means accommodating relative movement of the hand-lever to control reverse drive action of the primary transmission drive mechanism after the aforesaid lost-motion has been taken up, said hand-lever being effective in such controlling position to prevent closure of the contacts of the conditioning switch to cause energization of the pneumatic-shifting means.

12. Means as defined in claim 8 wherein the pneumatic-shifting means comprises a suction-operated servomotor and the source of pressure fluid therefor, the engine inlet-manifold.

13. Means as defined in claim 8 wherein the solenoid armature incorporates means cooperating with the actuating element of the aforesaid interrupter switch whereby the armature is yieldably held in its extreme operated position following de-energization of the solenoid, until acted upon by the hand-lever when moved to control neutral or reverse drive action of the said primary transmission drive-mechanism.

14. In a control mechanism for the highest and a lower speed drive of a multi-speed forward drive transmission system of an automotive vehicle equipped with a friction clutch having an operating pedal therefor, and an engine accelerator pedal, said lower speed drive of the transmission system being established initially by operating a manual-shift lever to a predetermined position; servo-mechanism including mechanism operated in advance by said clutch and accelerator pedals operated to predetermined positions to cause energization of said servo-mechanism to operate said two forward speed drives alternately; energizing means for said servo-mechanism; valve means for controlling the alternate energization of said servo-mechanism; electromagnetic means for controlling said valve means; a selective switch controlled by said manual-shift lever when operated to establish the aforesaid lower speed drive; circuit means including a source of electrical energy for energizing said electromagnetic means to operate said valve means and thus condition for operation said servo-mechanism to alternately establish said two forward speed drives, in response to successive like movements of said accelerated pedal with said transmission system first disposed in the lower speed drive and the selective switch closed by the aforesaid predetermined operation of said manual-shift lever.

15. A transmission control mechanism according to claim 14, wherein said circuit means includes a conditioning switch controlled into its open position by operation of said clutch pedal, and to its closed position by a predetermined depressing movement of said accelerator pedal.

16. A transmission control mechanism according to claim 14, wherein said manual-shift lever is adapted to be moved into a supplemental position in a single direction from either of said two forward speed drive establishing positions thereof, whereby said supplemental movement of said lever actuates said selective switch to closed condition, and in all other speed drive controlling positions of said lever, said selective switch is in open condition.

17. A transmission control mechanism according to claim 14, wherein said selective switch is operated to closed position by movement of the manual-shift lever substantially at either of the completed forward drive establishing positions thereof, and in all other speed drive controlling positions of said lever, said selective switch is in open condition.

18. In control means for a vehicular transmission system incorporating primary transmission driving means and supplemental transmission driving means adapted to be drivingly connected in series with an internal-combustion engine; engine accelerator mechanism movable from and to a released position wherein the engine idles; a movable element for regulating the action of the primary transmission driving means; energizable power means including a movable power element operatively connected to a member for controlling the action of the supplemental transmission driving means; a source of power force for operatively energizing said power means; and conditioning means having an element operable to operating position in response to said cyclic movement of said accelerator mechanism for causing initial application of said power force at reduced effectiveness insufficient to move said power element when said accelerator mechanism is predeterminately moved from released position, and for subsequently causing application of said power force at substantially maximum effectiveness to movably energize said power element to operate the supplemental transmission member when said accelerator mechanism is moved into released position.

19. Means as defined in claim 18 including a control element required to be operated to operating position in response to a predetermined movement of said primary transmission movable element, to render the said conditioning means when operated, effective to apply said variable power forces to operate said power means.

20. In a control means; a planetary overdrive unit adapted for installation in a vehicle powered by an engine controlled by an accelerator-actuated throttle, said accelerator being actuatable from a released position wherein the engine idles to a depressed position wherein the engine operates substantially at full speed; a reaction element operatively incorporated in the overdrive unit; a brake operable to engage and release the reaction element to establish and disable the overdrive; an overrunning clutch operatively incorporated in the overdrive unit for transmitting a direct-drive when the reaction element is released; positive two-way lockup means operably associated with the over-running clutch and engageable to establish a two-way direct-drive, said lockup means including a slidable clutch element; pre-energized spring means for biasing the slidable clutch element to engaged, lockup position; means including an energizable double-acting servomotor operable for slidably disengaging the clutch element during unidirectional operation of said servomotor in opposition to the biasing force of the said spring means; energizing force for operating said servomotor as aforesaid; conditioning means including a member actuatable in response to actuation of the accelerator from released position for causing partial energization of said servomotor to apply a force on the lockup clutch element insufficient to slidably dis-engage the same.

21. Means as defined in claim 20 including a brake releasing element actuatable in response to substantially full depression of the accelerator to re-establish direct-drive.

22. In combination with means as set forth in claim 21, an additional brake releasing element actuatable in response to engagement of said lockup clutch.

23. In a control means; a planetary overdrive unit adapted for installation in a motor vehicle controlled by an accelerator-actuated throttle, said accelerator being actuatable from a released position wherein the engine idles to a depressed position wherein the engine operates substantially at full speed; a reaction element and a brake operably incorporated in the overdrive unit to engage and release the reaction element to establish and disestablish respectively, the overdrive; an overrunning clutch operable to transmit a direct-drive when the reaction element is released; positive two-way lockup means operatively associated with the overrunning clutch and engageable to establish a two-way direct-drive, said lockup means including a positive clutch; pre-energized spring means for biasing the positive clutch to engaged, lockup position; means including an energizable double-acting servomotor operable for releasing the positive clutch during unidirectional operation of said servomotor in opposition to the biasing force of the spring means; a source of energizing force for operating said servomotor as aforesaid; means including a torque-responsive element actuatable in response to a forward coasting torque load to apply said brake; and conditioning means including a member actuatable in response to actuation of the accelerator in an engine accelerating direction from its released position to condition the servomotor to release the lockup clutch upon return actuation of the accelerator to released position wherein the servomotor is operatively energized to operate unidirectionally to release the positive clutch.

24. Means as set forth in claim 23 including a one-way acting connection element operatively interconnecting said spring means and brake applying means, to release the reaction element concurrently with engagement of the lockup clutch.

25. In combination with means as defined in claim 23, a clutch-controlling element actuatable by actuating the accelerator substantially to fully depressed position, to operate the servomotor unidirectionally in its opposite direction of operation and accommodate engagement of the lockup clutch by said spring means.

26. In a drive control system adapted for installation in an automotive vehicle having transmission mechanism; an engine controlling throttle actuated by an accelerator between two extreme positions wherein the engine idles and operates substantially at full speed respectively, said engine incorporating an inlet-manifold within which reduced pressure exists when the engine is operating, and wherein the degree of pressure reduction is inversely proportional to the extent of throttle opening at a given speed; a speed-changing member for the transmission mechanism; an energizable double-acting servomotor connectable to and actuatable in one direction by pressure differences generated in the inlet-manifold and in the opposite direction by pre-energized spring means, and operatively connected to said speed-changing member to actuate the same; controlling mechanism for said servomotor including an element adapted to be connected to and actuated by the accelerator to cause partial energization of the servomotor but insufficient to actuate the same upon actuation of the accelerator initially from its released engine idling position.

27. Means as set forth in claim 26 wherein said system is designed for installation in an automotive vehicle which also includes an additional speed-changing transmission agency operable independently of the first-mentioned transmission; a control member for said additional transmission agency; and a second controlling element for said servomotor actuatable by said control member.

28. Means as set forth in claim 27 wherein said first-mentioned transmission is a supplemental transmission and said additional transmission agency comprises a primary transmission, said controlling element being actuatable to connect the servomotor to the inlet-manifold in response to actuation of the accelerator to initially open the engine throttle, and the servomotor being operable in said one direction to shift such supplemental transmission to a higher speed drive when the pressure drops sufficiently in the inlet-manifold.

29. Means as set forth in claim 26 for installation in an automotive vehicle which also incorporates a primary torque-transmitting friction clutch; and means operatively connected to the friction clutch for actuating the controlling element in a direction reverse to that in which it is actuated by the accelerator, in response to disengagement of the friction clutch.

30. Means as defined in claim 27 for installation in an automotive vehicle which also incorporates a primary torque-transmitting friction clutch, and wherein said first-mentioned transmission is a supplemental transmission and said additional transmission agency comprises a primary transmission, said controlling element being actuatable to connect the servomotor to the inlet-manifold in response to initial actuation of the accelerator to partially open the engine-throttle above engine idling position, and the servomotor being operable in said one direction to shift such supplemental transmission to a higher speed drive when the pressure drops sufficiently in the inlet-manifold, and an interrupting element actuatable in response to disengagement of the friction clutch to cause operation of the servomotor in the opposite direction.

31. A system as defined in claim 27 adapted for installation in an automotive vehicle which also incorporates a clutch pedal, said controlling mechanism including an element actuatable in one direction by said accelerator and in the other direction by the clutch pedal.

32. A system as defined in claim 27 adapted for installation in an automotive vehicle wherein the transmission mechanism also includes a second speed-changing member and a personally-operable control device for controlling the actuation of said second speed-changing member independently of the first-mentioned speed-changing member, said controlling mechanism for the servomotor including means actuatable both by the accelerator and by said personally-operable control device when operated.

33. A system as defined in claim 27 adapted for installation in an automotive vehicle which also incorporates a clutch pedal, said controlling mechanism including an element actuatable by the accelerator and by the clutch pedal when the latter are operated.

34. In control means for a supplemental ratio transmission drive means adapted for installation in an automotive vehicle having an engine controlled by an accelerator-operated throttle; a primary transmission drive-mechanism, and a hand-lever for controlling the forward, neutral and reverse drive action of the primary transmission drive-mechanism; power-shifting means for operating the supplemental ratio transmission drive means; a source of power for said power-shifting means; a conditioning device having a movable element actuatable to operating position to control said power-shifting means; governor means responsive to the speed of an element driven at vehicular speed for actuating said conditioning device to operating position; and mechanism actuatable by the hand-lever when controlling the neutral or reverse drive action of the primary transmission drive mechanism, for actuating the conditioning device to a different position inhibiting control of the power shifting means.

35. Means as defined in claim 34 wherein said mechanism accommodates actuation of the conditioning device to operating position by the said governor means only when the hand-lever is controlling the forward drive action of the primary transmission drive-mechanism.

36. In control means for a supplemental ratio transmission drive means adapted for installation in an automotive vehicle equipped with an engine controlled by a movable accelerator mechanism operatable to idle the engine and to predetermined positions in an engine accelerating direction; an element actuatable to control the supplemental ratio drive means; conditioning means comprising an element actuatable to operating position to accommodate the aforesaid control of the supplemental ratio drive means, the conditioning element being actuatable in response to movement of the accelerator mechanism from engine idling position to a first predetermined position in an accelerating direction and the first-named element being actuatable in response to movement of the accelerator mechanism in the same direction to a second predetermined position to further accelerate the engine.

37. Means as defined in claim 36 wherein different predetermined cyclic movement of the accelerator mechanism from and to engine idling control thereof is effective to actuate both of the aforementioned elements to cause the supplemental ratio drive means to be operated.

38. Means as defined in claim 37 wherein movement of the accelerator mechanism from engine idling control thereof to substantially full engine accelerating position is effective to actuate the said first-named element to cause the supplemental ratio drive means to change the effective drive thereof without disturbing the operating position of the conditioning element.

39. In a control means; a planetary overdrive unit adapted for installation in a motor vehicle having an engine controlled by an accelerator-actuated throttle, said accelerator being actuatable from a released position wherein the engine idles and to a depressed position wherein the engine operates substantially at full speed; a reaction element operably incorporated in the overdrive unit including a brake operable to lock and release the reaction element to establish and dis-establish respectively, the overdrive; an overrunning clutch operable to accommodate the aforesaid functions of the reaction element; positive two-way lockup means operatively associated with the overrunning clutch and engageable to provide a two-way direct-drive and maintain the same established, said lockup means including a positive clutch; pre-energized spring means for biasing the positive clutch to engaged-lockup position; means including an energizable double-acting servomotor operable for releasing the positive clutch in opposition to the biasing force of the spring means to accommodate operation of the overdrive unit; energizing means for operating said servomotor in one direction; means including a torque-responsive element actuatable in response to a forward coasting torque load to cause said brake to operably lock said reaction element; means for causing said servomotor to be energized in two stages to effect the aforesaid operation thereof substantially simultaneously with the effectiveness of said coasting torque load in response to a cyclic actuation of the accelerator from and to released position.

40. In a control means; a planetary overdrive unit adapted for installation in a motor vehicle having an engine controlled by an accelerator-actuated throttle, said accelerator being actuatable from a released position wherein the engine idles and to a depressed position wherein the engine operates substantially at full speed; a reaction element operably incorporated in the overdrive unit including a brake operable to lock and release the reaction element to establish and dis-establish respectively, the overdrive; an overrunning clutch operable to accommodate the aforesaid functions of the reaction element; positive two-way lockup means operatively associated with the overrunning clutch and engageable to provide a two-way direct-drive and maintain the same established, said lockup means including a positive clutch; pre-energized spring means for biasing the positive clutch to engaged-lockup position; means including an energizable double-acting servomotor having a power element movable in one direction for operably releasing the positive clutch in opposition to the biasing force of the spring means to accommodate operation of the overdrive unit; energizing means for said servomotor; means including a torque-responsive element actuatable in response to a forward coasting torque load to cause said brake to operably lock said reaction element; means for causing said servomotor to be energized in two stages to effect the aforesaid operation thereof in response to a cyclic actuation of the accelerator from and to released position; and means operable for causing said brake to release said reaction element when the said power element of said servomotor is operated in its opposite direction under influence of said spring means in response to operating the accelerator substantially to its fully depressed position wherein energization of said servomotor in said one direction of operation is interrupted.

41. Means as defined in claim 40 including means normally engaging the said lockup clutch means, and means including an element actuatable in response to initial actuation of said accelerator from engine idling position to release the said lockup clutch means.

42. Means as defined in claim 41 including means comprising an element actuatable in response to partial engine accelerating actuation of the accelerator to release the said lockup clutch means, and means comprising an element actuatable in response to full engine accelerating actuation of the accelerator to release the said brake.

43. In vehicular engine driven change-speed drive mechanism having at least two different forward speed drives and energizable power means to activate the same including a source of energizing power force; a movable accelerator mechanism to control engine speed; control means having an element operable to operating position in response to a predetermined movement of the accelerator mechanism in an engine accelerating direction from engine idling position of control thereof for causing statical energization of said power means, said statically energized power means being rendered fully energized to operate upon return movement of the accelerator mechanism to engine idling position of control to activate one of said speed drives.

44. A vehicular change-speed drive mechanism according to claim 43 wherein the power means is a double-acting vacuum and spring operated servomotor having a power element movable reciprocally between two extreme operative positions and operable to one of its positions in response to a predetermined change in pressure conditions produced in the engine inlet-manifold as a result of the aforesaid accelerator mechanism movements to activate the higher of the two speed drives.

45. A vehicular change-speed drive mechanism according to claim 43 wherein the drive mechanism includes a control element operable in response to movement of the accelerator mechanism substantially to full engine operating position to cause spring operation of the servomotor to activate the lower of the two speed drives.

46. A vehicular change-speed drive mechanism according to claim 43 wherein the control means operable in response to the predetermined movement of the accelerator includes another element movable to operating position responsive to the first-named element operated to operating position to induce said statical energization of the power means.

47. A vehicular change-speed drive mechanism according to claim 43 including a manual shift-lever and mechanism operated thereby to neutralize the two forward speed drives, and to condition the two forward speed drives for selective activation by said power means in the manner described.

48. A vehicular change-speed drive mechanism according to claim 47 wherein said control means includes a control element operable in response to operating the shift-lever to conditioning position to render the source of energizing power available.

49. A vehicular change-speed drive mechanism according to claim 48 wherein means is provided to accommodate a supplemental movement of the shift-lever from an activating drive position thereof to control the said control element.

50. A vehicular change-speed drive mechanism according to claim 48 wherein means is provided for controlling the said control element by the shift-lever when the latter is operated substantially in a drive activated position.

51. A vehicular change-speed drive mechanism according to claim 48 wherein the said control element is a switch.

52. Vehicular change-speed drive mechanism according to claim 44 wherein the said servomotor spring means acts in one direction on the movable reciprocating element to bias the same to its other operative position.

53. Vehicular change-speed drive mechanism according to claim 52 wherein the servomotor also incorporates electromagnetic holding means energizable by circuit means in series with the said switch control element to effect seizure of the movable power element substantially when operated to one of its operative positions by differential fluid pressure to maintain said power element in said operative positive independently of or in cooperation with the differential fluid pressure, said circuit means including a source of electrical energy to energize the electro-magnetic holding means when said switch control element is in operating (closed) position.

54. A control system adapted for installation in an automotive vehicle having a change-speed transmission mechanism; an actuatable drive disengaging device; an engine controllable by a throttle operated by an accelerator movable from and to released position wherein the engine idles, said engine having an inlet-manifold within which reduced pressure exists when the engine is operating and wherein the degree of pressure reduction is inversely proportional to the extent of throttle opening from idling position at a given engine speed; a speed-changing member for the transmission mechanism; a servo-mechanism connectable to and actuatable by the pressure differences generated within the inlet-manifold as aforesaid in one direction and actuatable in the opposite direction by pre-energized spring means following interruption of pressure differences, and operatively connected to said speed-changing member to actuate the same; controlling means for causing said servo-mechanism to actuate responsive to such pressure differences in opposition to the force of said spring means and including an element operatively connected with and actuatable to operating position by the accelerator when said accelerator is operated from released position; and means operable in response to actuation of said drive disengaging means for actuating the element of said controlling means to inoperative position wherein said pressure differences are ineffective to actuate said servo-mechanism thereby accommodating operation of said servo-mechanism in the opposite direction under influence of said spring means.

55. In control means: transmission drive mechanism operable to produce a first and a second forward drive and adapted for installation in engine-propelled vehicle having an engine throttle responsive to accelerator mechanism including a pedal movable from and to a released position wherein the engine idles; a hand-lever operable to a predetermined setting for conditioning the transmission mechanism for operation; power-shifting means for operating the transmission mechanism; a source of energy for operating said power-shifting means; conditioning means including an element movable to first and second operating positions for causing operation of the transmission mechanism by said power-shifting means, said element being operably connected with both the accelerator pedal and said hand-lever whereby the aforesaid setting of said hand-lever accommodates movement of said element to second operating position when said accelerator is moved from released position to cause said power-shifting means to operate the transmission mechanism to produce second forward drive upon movement of said accelerator pedal back to its released position; and means operable in response to movement of said accelerator pedal to fully accelerate the engine, for causing said power-shifting means to operate the transmission mechanism to change the effective drive thereof from second forward drive to first forward drive.

56. Control means according to claim 55 in which operation of said hand-lever from said predetermined setting to another predetermined setting provided therefor to effect neutral drive condition in the transmission drive mechanism, operates the movable element of said conditioning means back to first operating position causing said power-shifting means to operate the transmission mechanism to render first forward drive effective upon operating said hand-lever to its first-named predetermined setting.

57. Control means according to claim 56 in which said power-shifting means comprise a control device therefor and a movable power element operatively connected to the transmission drive mechanism, said connection providing limited lost-motion initial movement of said power element with respect to the transmission drive mechanism; and ignition interrupting means for momentarily disabling operation of the engine and operable during said lost-motion movement of said power element whereby operation of the transmission drive mechanism by said power-shifting means to change the effective drive thereof is facilitated.

58. In control means for supplemental transmission drive means providing two different establishable drives and adapted for installation in a vehicle having engine accelerator mechanism movable from released position wherein the engine idles; the transmission drive means having separate mechanisms for rendering the drive means operative to alternately establish the two drives and to establish only the lower of the two drives respectively, including an element movable to condition in part the supplemental drive means to be operative as aforesaid and another element movable to render the same operative to establish the lower of the two drives, a portion operatively connecting one of said elements to the accelerator mechanism for actuation in response to movement thereof from released position to partially accelerate the engine, another portion operatively connecting the other of said elements to the accelerator mechanism for actuation in response to movement thereof substantially to fully accelerate the engine, and one-way connecting mechanism operably disposed between the other element and the mechanism for rendering the drive means operative to alternately establish the two drives, for operating said other element by this latter mechanism independently of the accelerator mechanism.

59. Control means according to claim 58 wherein the element of the mechanism for rendering said supplemental drive means operative is actuatable by such movement of the accelerator mechanism to fully accelerate the engine.

60. Control means according to claim 58 wherein said element movable to condition in part the mechanism for rendering said supplemental drive means operative is actuatable by such movement of the accelerator mechanism from released position to partially accelerate the engine.

61. Control means according to claim 58 wherein said conditioning element forms part of the mechanism for rendering the supplemental drive means operative and is actuatable to operating position by such movement of the accelerator mechanism from released position to partially accelerate the engine, said mechanism including a servomotor for engaging an operatively connected clutch element to complete the conditioning of said mechanism for operation when fully energized, said energization of the servomotor being statically effective by the aforesaid movement of the accelerator mechanism to actuate the conditioning element and rendered operatively effective by a subsequent released positioning of the accelerator mechanism after actuating the conditioning element as aforesaid, and energizing means for said servomotor.

62. Control means according to claim 61 including a personally-operable control member required to be operated to operating position, to place the said energizing means in communication with said servomotor via said conditioning element.

63. Means as defined in claim 18 in which the primary transmission driving means comprise: a driving shaft, a countershaft, a driven shaft, four gearset connections between said shafts, and two elements slidably mounted on said driven shaft and non-rotatable with respect thereto, for selective engagement with said connections to produce low, intermediate, and direct forward speed drives and a reverse speed drive, respectively.

64. Means as defined in claim 63 in which the primary transmission movable element is a manually-operated shift-lever.

65. Means as defined in claim 18 in which the primary transmission driving means comprise: a driving shaft, a countershaft, a driven shaft, three gearset connections between said shafts, and two elements slidably mounted on said driven shaft and non-rotatable with respect thereto, for selective engagement with said connections to produce low, and direct forward speed drives and a reverse speed drive, respectively.

66. Means as defined in claim 65 in which the primary transmission movable element is a manually-operated shift-lever.

67. Means as defined in claim 65 including a sleeve rotatably mounted on the driven shaft, one of said elements being slidably mounted on the sleeve and non-rotatable with respect thereto, for selective engagement with the connections to produce the two forward speed drives, and the other element being adapted to connect the sleeve to the driven shaft to render the two forward speed drives effective upon their respective connections being selectively engaged as aforesaid.

68. Means as defined in claim 34 in which the primary transmission drive-mechanism comprise: a driving shaft, a countershaft, a driven shaft, a sleeve rotatably mounted on the driven shaft, means for selectively driving the sleeve at two different forward speed drives from said driving shaft including a slidable double-clutch member, means for selectively driving a reverse gearset from said driving shaft, a double-clutch member slidably and non-rotatably mounted on said driven shaft for selectively connecting said sleeve and reverse gearset to said driven shaft, means for sliding said first-named clutch member, and means independent of said last-named means for sliding said last-named clutch member as aforesaid.

69. Means as defined in claim 34 in which the primary transmission drive-mechanism comprise: a driving shaft, a driven shaft, a sleeve rotatably mounted on the driven shaft, a gear rotatably mounted on said sleeve, means for driving said gear from said driving shaft, a slidable double-clutch element non-rotatably mounted on said driven shaft for connecting the sleeve to the driven shaft when slid to a predetermined position from a disconnecting position, and for connecting another gear when slid from said disconnecting position to a different predetermined position opposite the sleeve connecting position, means for driving said last-named gear from said driving shaft, means comprising a slidable double-clutch element non-rotatably mounted on the sleeve for selectively connecting the driving shaft and said first-named gear to the sleeve, controllable motor-power means operatively connected to slide said last-named clutch element to its said connecting positions, control means for said motor-power means including a source of power, and manually-controlled means for selectively sliding said first-named slidable double-clutch element to its aforementioned connecting and disconnecting positions.

70. Means as defined in claim 34 in which the primary transmission drive-mechanism comprise: a driving shaft, a countershaft, a driven shaft, two gearset connections between said shafts, and an element slidably mounted on said driven shaft and non-rotatable with respect thereto, for selective engagement with said connections to produce a forward speed direct drive and a reverse speed drive, respectively.

71. Means as defined in claim 70 in which the primary transmission movable element is a manually-operated shift-lever.

72. Means as defined in claim 34 including a control device having an element movable between two operating positions and operatively connected to actuate the movable element of the conditioning device to operating position, another control device operably associated with the movable element of the first-mentioned control device and operable in response to movement thereof substantially in one of its operating positions to release the movable element of the first-mentioned control device for movement to its other operating position notwithstanding the conditioning device is in operating position.

73. Means as defined in claim 72 including connections between said hand-lever and conditioning device, and operable in response to movement of the hand-lever to control neutral or reverse action of the primary transmission drive-mechanism, to actuate the movable element of the conditioning device to its different operating position.

74. Control means according to claim 57 in which the transmission drive mechanism comprise: a driving shaft, a driven shaft, a sleeve rotatably mounted on the driven shaft, means for selectively driving the sleeve at two different forward speed drives from said driving shaft including a slidable double-clutch member, means for selectively driving a reverse drive gear set from said driving shaft, a double-clutch member slidably and non-rotatably mounted on said driven shaft for selectively connecting said sleeve and reverse gear set to said driven shaft, means for sliding said first-named clutch member, and means independent of said last-named means for sliding said last-named clutch member as aforesaid.

75. Control means according to claim 57 in which the transmission drive mechanism comprise: a driving shaft, a driven shaft, a sleeve rotatably mounted on the driven shaft, a gear rotatably mounted on said sleeve, means for driving said gear from said driving shaft, a slidable double-clutch element non-rotatably mounted on said driven shaft for connecting the sleeve to the driven shaft when slid to a predetermined position from a disconnecting position, and for connecting another gear when slid from said disconnecting position to a different predetermined position opposite the sleeve connecting position, means for driving said last-named gear from said driving shaft, means comprising a slidable double-clutch element non-rotatably mounted on the sleeve for selectively connecting the driving shaft and said first-named gear to the sleeve and shiftable to its connecting positions by the power-shifting means, and manually-controlled means for selectively sliding said first-named slidable double-clutch element to its aforementioned connecting and disconnecting positions.

76. Control means according to claim 57 in which the engine ignition interrupting means comprise: an electric circuit in which is incorporated an interrupter switch having a movable contact and a pair of fixed contacts, said movable element being actuated during said initial lost-motion movement of the power element to bridge the pair of fixed contacts whereby the ignition system is disabled during a shifting operation of the power-shifting means to facilitate operation of the transmission drive mechanism in changing the effective drive thereby.

77. Control means according to claim 76 including means associated with the lost-motion connection for releasing the movable element of the interrupter switch whereby the ignition system is restored to normal operating condition upon completion of the selected shifting operation.

78. Control means according to claim 57 including a fluid-coupling drive operably disposed between the engine and transmission drive mechanism.

79. Control means according to claim 55 including a switch actuated by the accelerator pedal, and an electrical circuit therefor.

80. Control means according to claim 79 in which the conditioning means includes a switch having a movable contact and a pair of fixed contacts, and a manually-controlled switch having a movable contact and a fixed contact, in series with the switch actuated by the accelerator pedal.

81. Control means according to claim 80 in which the power-shifting means comprise: a cylinder closed at one end, an electromagnetic holding coil means fixed within the cylinder to said one end, and an element fixed to the movable power element composed of paramagnetic material for co-operating with said holding coil when energized to hold the power element at said one end of the cylinder, said coil means being in series with the three switches aforesaid.

82. Control means according to claim 55 in which the first and second forward drives are low speed and direct-drive respectively.

83. Control means according to claim 55 in which the engine is provided with an ignition system, an ignition control switch adapted when closed to render the ignition system operative and when open to render the ignition system inoperative; and an ignition interrupter switch in said ignition system operably associated with the power-shifting means for rendering the ignition system inoperative despite closed condition of the ignition control switch during a shifting operation of the power-shifting means induced by released or fully depressed positions substantially of the accelerator pedal to cause second and first forward drives, respectively, to be established.

84. Control means according to claim 83 in which said power-shifting means include a control device therefor, a movable power element, and actuating means carried by the power element for controlling the ignition interrupter switch.

85. In a transmission control system for the operation of a shiftable two-speed drive mechanism, an internal-combustion engine having a throttle and an intake-manifold, an accelerator pedal operably connected to said throttle normally in released position wherein the engine idles, a fluid-pressure operated servomotor for operating said drive mechanism; a selector valve having an element actuatable to two operating positions for controlling energization of said servomotor, fluid conduit means for inteconnecting the intake-manifold of the engine, the selector valve and the servomotor: conditioning means including an element movable to one of two operating positions for causing the selector valve element to be actuated to one of its operating positions to accommodate two-stage energization of the servomotor in one direction; connections between the element of the conditioning means and the accelerator pedal to enable movement of said latter element to cause actuation of the selector valve element as aforesaid to statically energize the servomotor responsive to a predetermined manipulation of the accelerator pedal from its released position, said drive mechanism comprising a shiftable toothed member and a pair of toothed members adapted to be selectively meshed with said shiftable member for driving the mechanism in either of its two speed drives; means operably interconnecting said servomotor and said shiftable member so that the latter is demeshed from one of said two members and meshed with the other during the stroke of said servomotor in one direction, the drive-torque exerted by said engine acting in opposition to the demeshing force exerted by said servomotor to maintain said shiftable member against demesh from that one of said two members with which it is meshed while said servomotor is statically energized for the corresponding stroke, manipulation of said accelerator pedal back to its released position causing reduced throttle opening to momentarily interrupt said drive-torque and thus enable operative energization, resulting from lowered pressure conditions within the engine intake-manifold, of the servomotor to disengage said shiftable member from said one member and move said shiftable member toward said other member into synchronizing engagement therewith which, when effected, enables continued movement of said shiftable member in the same direction until the latter becomes meshed with said other member; and personally-operable means for moving the element of the conditioning means to its other operating position causing the element of the selector valve to actuate to its other operating position wherein the servomotor is operated in the opposite direction to the position corresponding to its statically energized status aforesaid and the shiftable member meshed with the one member aforesaid.

86. The transmission control system according to claim 85 in which the servomotor comprises: a cylinder, and a movable power member reciprocably mounted within said cylinder and having spring action in one direction.

87. The transmission control system according to claim 86 in which the selector valve comprises: a solenoid-controlled movable element adapted to co-operate selectively with a pair of fixed valve seats encircling ports therethrough, a source of electrical energy, and an electrical control circuit for connecting the solenoid to the source.

88. The transmission control system according to claim 87 in which the conditioning means comprise: an electric switch in said electrical control circuit having a contact movable into completed engagement with a fixed contact by over-center spring action induced by the predetermined manipulation of the accelerator pedal.

89. The transmission control system according to claim 88 in which the personally-operable means comprise: a pedal, and mechanical linkage for connecting the same to the movable contact of the conditioning means.

90. The transmission control system according to claim 88 in which the personally-operable means comprise: a hand-lever, mechanical linkage for connecting the same to the movable contact of the conditioning means, and an electric switch in the electrical control circuit.

91. The transmission control system according to claim 86 including a lost-motion connection between the power member and shiftable member, an ignition system for the engine, a switch in the circuit of the ignition system adapted to interrupt operation thereof responsive to initial operative energization of the power member provided by the lost-motion connection, to interrupt drive-torque on the drive mechanism thereby releasing the shiftable toothed member for movement by the servo-motor after the lost-motion is taken up.

92. In an automotive transmission mechanism wherein a member is selectively movable to one or the other of two positions to effect certain settings of the mechanism: fluid-pressure responsive means of relatively reduced power in one phase of its operation insufficient to move said member to disestablish the then existing setting of the mechanism, and sequentially acting at relatively maximum power in the same direction in another phase of its operation to move said member to establish the mechanism in a different one of its settings; an internal combustion engine having a intake-manifold, an accelerator mechanism including a throttle device for controlling operation of the engine at substantially idling speed wherein maximum reduced pressure conditions are created in the intake-manifold to produce said maximum power operational phase; conditioning means including an element actuatable to operating position for accommodating both operational phases of said fluid-pressure responsive means in response to a predetermined manipulation of the accelerator mechanism from idling speed control in an engine accelerating direction causing higher pressure conditions to be created within the intake-manifold with resultant reduced power operational phase aforesaid, and manipulation of the accelerator mechanism back to idling speed control causing maximum reduced pressure conditions to be created within the intake-manifold with resultant maximum power operational phase for the purpose aforesaid.

References Cited in the file of this patent

UNITED STATES PATENTS

| | | | |
|---|---|---|---|
| 2,070,215 | Nardone | Feb. 9, | 1937 |
| 2,254,335 | Vincent | Sept. 2, | 1941 |
| 2,263,400 | Schwarz | Nov. 18, | 1941 |
| 2,333,668 | Neracher et al. | Nov. 9, | 1943 |
| 2,365,732 | Snow | Dec. 26, | 1944 |
| 2,398,814 | Taylor | Apr. 23, | 1946 |
| 2,402,343 | Price | June 18, | 1946 |
| 2,519,080 | Simpson | Aug. 15, | 1950 |
| 2,666,337 | Brownyer | Jan. 19, | 1954 |